US009000903B2

(12) United States Patent
Bowers et al.

(10) Patent No.: US 9,000,903 B2
(45) Date of Patent: Apr. 7, 2015

(54) SYSTEMS AND METHODS FOR VEHICLE MONITORING

(75) Inventors: Jeffrey A. Bowers, Issaquah, WA (US); Geoffrey F. Deane, Bellevue, WA (US); Roderick A. Hyde, Redmond, WA (US); Nathan Kundtz, Kirkland, WA (US); Nathan P. Myhrvold, Medina, WA (US); David R. Smith, Durham, NC (US); Clarence T. Tegreene, Bellevue, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 148 days.

(21) Appl. No.: 13/544,799

(22) Filed: Jul. 9, 2012

(65) Prior Publication Data

US 2014/0009275 A1 Jan. 9, 2014

(51) Int. Cl.
| | |
|---|---|
| B60Q 1/00 | (2006.01) |
| G06Q 40/08 | (2012.01) |
| G06F 12/00 | (2006.01) |
| G06Q 20/14 | (2012.01) |
| G08G 1/16 | (2006.01) |
| G07C 5/00 | (2006.01) |

(52) U.S. Cl.
CPC ...... *B60Q 1/00* (2013.01); *G06F 12/00* (2013.01); *G06Q 40/08* (2013.01); *G06Q 20/145* (2013.01); *G07C 5/008* (2013.01); *G08G 1/163* (2013.01)

(58) Field of Classification Search
CPC ..... G06Q 40/00; G06Q 40/08; G06Q 20/145; G06F 12/00; B60Q 1/525; G60Q 9/008; G07C 5/008

USPC ........ 340/436, 435, 438, 902, 903; 701/4, 29, 701/35, 301, 300; 705/4, 34, 39; 711/154
See application file for complete search history.

(56) References Cited

U.S. PATENT DOCUMENTS

| | | |
|---|---|---|
| 5,497,419 A | 3/1996 | Hill |
| 5,646,994 A | 7/1997 | Hill |
| 6,064,970 A | 5/2000 | McMillian et al. |

(Continued)

FOREIGN PATENT DOCUMENTS

WO    WO 03/001474 A2    1/2003

OTHER PUBLICATIONS

U.S. Appl. No. 13/544,770, filed Jan. 9, 2004, Bowers et al.

(Continued)

*Primary Examiner* — Hung T Nguyen

(57) ABSTRACT

A monitoring service is configured to receive monitoring data from one or more collision detection systems. The monitoring data may comprise collision detection information, such as a collision detection model, sensor data, data pertaining to potential collisions, data pertaining to collisions, vehicle identifier(s), and so on. The monitoring service may extract and/or derive indexing criteria from the monitoring data, and may store and/or index the monitoring data on a persistent storage. An entity may request monitoring data pertaining to a specified time, location, and/or vehicle. The monitoring service may respond to the request by identifying monitoring data that conforms with the request, and providing the identified monitoring data to the requesting entity. The monitoring service may issue collision notifications to emergency service entities and/or may provide collision alerts to vehicles in the vicinity of a collision.

25 Claims, 15 Drawing Sheets

(56) References Cited

U.S. PATENT DOCUMENTS

| | | | |
|---|---|---|---|
| 6,141,611 A * | 10/2000 | Mackey et al. | 701/32.2 |
| 6,185,490 B1 | 2/2001 | Ferguson | |
| 6,223,125 B1 | 4/2001 | Hall | |
| 6,246,933 B1 * | 6/2001 | Bague | 701/32.2 |
| 6,295,502 B1 | 9/2001 | Hancock et al. | |
| 6,438,472 B1 | 8/2002 | Tano et al. | |
| 6,445,983 B1 | 9/2002 | Dickson et al. | |
| 6,487,500 B2 | 11/2002 | Lemelson et al. | |
| 6,573,831 B2 | 6/2003 | Ikeda et al. | |
| 6,615,137 B2 * | 9/2003 | Lutter et al. | 701/301 |
| 6,630,884 B1 * | 10/2003 | Shanmugham | 340/436 |
| 6,643,578 B2 | 11/2003 | Levine | |
| 6,950,013 B2 | 9/2005 | Scaman et al. | |
| RE38,870 E | 11/2005 | Hall | |
| 6,969,287 B1 | 11/2005 | Motsenbocker | |
| 7,065,019 B2 | 6/2006 | Park et al. | |
| 7,124,027 B1 | 10/2006 | Ernst, Jr. et al. | |
| 7,190,260 B2 | 3/2007 | Rast | |
| 7,512,516 B1 | 3/2009 | Widmann | |
| 7,821,421 B2 | 10/2010 | Tamir et al. | |
| 7,859,392 B2 | 12/2010 | McClellan et al. | |
| 8,031,085 B1 | 10/2011 | Anderson | |
| 8,090,598 B2 | 1/2012 | Bauer et al. | |
| 8,140,358 B1 | 3/2012 | Ling et al. | |
| 8,180,514 B2 | 5/2012 | Kaprielian et al. | |
| 8,352,110 B1 | 1/2013 | Szybalski et al. | |
| 8,352,111 B2 | 1/2013 | Mudalige | |
| 8,508,353 B2 | 8/2013 | Cook et al. | |
| 8,630,768 B2 | 1/2014 | McClellan et al. | |
| 2001/0033661 A1 | 10/2001 | Prokoski | |
| 2001/0034573 A1 | 10/2001 | Morgan et al. | |
| 2002/0003488 A1 | 1/2002 | Levin et al. | |
| 2002/0010935 A1 | 1/2002 | Sitnik | |
| 2002/0041240 A1 | 4/2002 | Ikeda et al. | |
| 2002/0097193 A1 * | 7/2002 | Powers | 345/2.3 |
| 2002/0111725 A1 | 8/2002 | Burge | |
| 2002/0174360 A1 | 11/2002 | Ikeda | |
| 2002/0198632 A1 | 12/2002 | Breed et al. | |
| 2003/0014176 A1 | 1/2003 | Levine | |
| 2003/0073406 A1 | 4/2003 | Benjamin et al. | |
| 2003/0102997 A1 | 6/2003 | Levin et al. | |
| 2003/0149530 A1 | 8/2003 | Stopczynski | |
| 2003/0158758 A1 | 8/2003 | Kanazawa et al. | |
| 2003/0171865 A1 | 9/2003 | Moser et al. | |
| 2004/0085198 A1 | 5/2004 | Saito et al. | |
| 2004/0139034 A1 | 7/2004 | Farmer | |
| 2004/0153362 A1 * | 8/2004 | Bauer et al. | 705/10 |
| 2004/0233045 A1 | 11/2004 | Mays | |
| 2005/0055248 A1 | 3/2005 | Helitzer et al. | |
| 2005/0065682 A1 | 3/2005 | Kapadia et al. | |
| 2005/0065711 A1 | 3/2005 | Dahlgren et al. | |
| 2005/0091175 A9 | 4/2005 | Farmer | |
| 2005/0125117 A1 | 6/2005 | Breed | |
| 2006/0089766 A1 | 4/2006 | Allard et al. | |
| 2006/0208169 A1 | 9/2006 | Breed et al. | |
| 2006/0212195 A1 * | 9/2006 | Veith et al. | 701/35 |
| 2006/0213359 A1 | 9/2006 | Vitale et al. | |
| 2006/0271258 A1 | 11/2006 | Salmeen et al. | |
| 2007/0018877 A1 | 1/2007 | Bailey | |
| 2007/0032952 A1 | 2/2007 | Carlstedt et al. | |
| 2007/0055553 A1 | 3/2007 | Kwan | |
| 2007/0088488 A1 | 4/2007 | Reeves et al. | |
| 2007/0135979 A1 | 6/2007 | Plante | |
| 2007/0135980 A1 | 6/2007 | Plante | |
| 2007/0136078 A1 | 6/2007 | Plante | |
| 2007/0219720 A1 | 9/2007 | Trepagnier et al. | |
| 2007/0225912 A1 | 9/2007 | Grush | |
| 2007/0273495 A1 | 11/2007 | Kesterson | |
| 2007/0287473 A1 | 12/2007 | Dupray | |
| 2008/0027591 A1 | 1/2008 | Lenser et al. | |
| 2008/0033604 A1 | 2/2008 | Margolin | |
| 2008/0065401 A1 | 3/2008 | Abrahamson | |
| 2008/0097699 A1 | 4/2008 | Ono | |
| 2008/0114530 A1 | 5/2008 | Petrisor et al. | |
| 2008/0221776 A1 | 9/2008 | McClellan | |
| 2008/0234907 A1 | 9/2008 | Labuhn et al. | |
| 2008/0243378 A1 | 10/2008 | Zavoli | |
| 2008/0243558 A1 | 10/2008 | Gupte | |
| 2008/0252487 A1 | 10/2008 | McClellan et al. | |
| 2008/0255722 A1 | 10/2008 | McClellan et al. | |
| 2008/0258890 A1 | 10/2008 | Follmer et al. | |
| 2008/0262670 A1 | 10/2008 | McClellan et al. | |
| 2008/0294690 A1 | 11/2008 | McClellan et al. | |
| 2008/0320036 A1 | 12/2008 | Winter | |
| 2009/0051510 A1 | 2/2009 | Follmer et al. | |
| 2009/0157566 A1 | 6/2009 | Grush | |
| 2009/0174573 A1 | 7/2009 | Smith | |
| 2009/0192710 A1 | 7/2009 | Eidehall et al. | |
| 2009/0210257 A1 | 8/2009 | Chalfant et al. | |
| 2009/0228172 A1 | 9/2009 | Markyvech et al. | |
| 2009/0292467 A1 | 11/2009 | McNelis et al. | |
| 2009/0327066 A1 | 12/2009 | Flake et al. | |
| 2010/0010742 A1 | 1/2010 | Mochizuki | |
| 2010/0039313 A1 | 2/2010 | Morris | |
| 2010/0097208 A1 | 4/2010 | Rosing et al. | |
| 2010/0106344 A1 | 4/2010 | Edwards et al. | |
| 2010/0106356 A1 | 4/2010 | Trepagnier et al. | |
| 2010/0131303 A1 | 5/2010 | Collopy et al. | |
| 2010/0131304 A1 | 5/2010 | Collopy et al. | |
| 2010/0131307 A1 | 5/2010 | Collopy et al. | |
| 2010/0131308 A1 | 5/2010 | Collopy et al. | |
| 2010/0138244 A1 | 6/2010 | Basir | |
| 2010/0141518 A1 | 6/2010 | Hersey et al. | |
| 2010/0164789 A1 | 7/2010 | Basnayake | |
| 2010/0174566 A1 | 7/2010 | Helitzer et al. | |
| 2010/0188201 A1 | 7/2010 | Cook et al. | |
| 2010/0214085 A1 | 8/2010 | Avery et al. | |
| 2010/0250021 A1 | 9/2010 | Cook et al. | |
| 2010/0256836 A1 | 10/2010 | Mudalige | |
| 2010/0262364 A1 | 10/2010 | Ikeda | |
| 2010/0271256 A1 | 10/2010 | Tsunekawa | |
| 2010/0332266 A1 | 12/2010 | Tamir et al. | |
| 2011/0010023 A1 | 1/2011 | Kunzig et al. | |
| 2011/0040579 A1 | 2/2011 | Havens | |
| 2011/0106442 A1 | 5/2011 | Desai et al. | |
| 2011/0122026 A1 | 5/2011 | DeLaquil et al. | |
| 2011/0130913 A1 | 6/2011 | Duggan et al. | |
| 2011/0161116 A1 | 6/2011 | Peak et al. | |
| 2011/0161244 A1 | 6/2011 | Iyer et al. | |
| 2011/0213628 A1 | 9/2011 | Peak et al. | |
| 2011/0254708 A1 | 10/2011 | Anderson | |
| 2011/0267205 A1 | 11/2011 | McClellan et al. | |
| 2011/0270476 A1 | 11/2011 | Doppler et al. | |
| 2011/0307139 A1 | 12/2011 | Caminiti et al. | |
| 2012/0028680 A1 | 2/2012 | Breed | |
| 2012/0044066 A1 | 2/2012 | Mauderer et al. | |
| 2012/0050089 A1 | 3/2012 | Gurevich et al. | |
| 2012/0072051 A1 | 3/2012 | Koon et al. | |
| 2012/0072241 A1 | 3/2012 | Krause et al. | |
| 2012/0083960 A1 | 4/2012 | Zhu et al. | |
| 2012/0089423 A1 | 4/2012 | Tamir et al. | |
| 2012/0101921 A1 | 4/2012 | Anderson et al. | |
| 2012/0109446 A1 | 5/2012 | Yousefi et al. | |
| 2012/0123806 A1 | 5/2012 | Schumann, Jr. et al. | |
| 2012/0166229 A1 | 6/2012 | Collins et al. | |
| 2012/0173290 A1 | 7/2012 | Collins et al. | |
| 2012/0209634 A1 | 8/2012 | Ling et al. | |
| 2012/0249341 A1 | 10/2012 | Brown et al. | |
| 2012/0259666 A1 | 10/2012 | Collopy et al. | |
| 2012/0268235 A1 | 10/2012 | Farhan et al. | |
| 2012/0271500 A1 | 10/2012 | Tsimhoni et al. | |
| 2012/0296539 A1 | 11/2012 | Cooprider et al. | |
| 2013/0093582 A1 | 4/2013 | Walsh et al. | |
| 2013/0145482 A1 | 6/2013 | Ricci et al. | |
| 2013/0187792 A1 | 7/2013 | Egly | |
| 2013/0253816 A1 | 9/2013 | Caminiti et al. | |
| 2013/0279491 A1 | 10/2013 | Rubin et al. | |
| 2014/0002252 A1 | 1/2014 | Fong et al. | |

OTHER PUBLICATIONS

U.S. Appl. No. 13/544,757, filed Jan. 9, 2014, Bowers et al.
U.S. Appl. No. 13/466,910, filed Nov. 14, 2013, Hyde et al.
U.S. Appl. No. 13/466,902, filed Nov. 14, 2013, Hyde et al.

(56) References Cited

OTHER PUBLICATIONS

U.S. Appl. No. 13/401,631, filed Aug. 22, 2013, Hagelstein et al.
U.S. Appl. No. 13/401,566, filed Aug. 22, 2013, Hagelstein et al.
PCT International Search Report; International App. No. PCT/US13/49583; Sep. 4, 2013; pp. 1-2.
PCT International Search Report; International App. No. PCT/US2013/049571; Sep. 17, 2013; pp. 1-2.
PCT International Search Report; International App. No. PCT/US2013/027151; Apr. 26, 2013; pp. 1-2 (plus 2 pages of Search History).
Zhu et al.; U.S. Appl. No. 61/391,271, filed Oct. 8, 2010; 3 pages.
PCT International Search Report; International App. No. PCT/US2013/049579; Sep. 24, 2013; pp. 1-2.
Li et al.; "Multi-user Data Sharing in Radar Sensor Networks"; SenSys-07 Proceedings of the 5$^{th}$ International conference on Embedded networked sensor systems; Nov. 2007; pp. 247-260; ACM Digital Library; Landon IP Inc.; retrieved from: http://none.cs.umas.edu/papers/pdf/SenSys07-Utility.pdf.

\* cited by examiner

US 9,000,903 B2

SYSTEMS AND METHODS FOR VEHICLE MONITORING

TECHNICAL FIELD

This disclosure relates to systems and methods for a vehicle monitoring service.

SUMMARY

A vehicle may comprise a collision detection system that is configured to detect potential collisions involving the vehicle and/or other objects in proximity to the vehicle. The objects may include, but are not limited to: pedestrians, animals, vehicles, road hazards, road features (e.g., barriers, bridge supports), and the like. The collision detection system may be configured to acquire sensor data using a sensing system of the vehicle and/or a sensing system of one or more other vehicles. The collision detection system may use the acquired sensor data to detect potential collisions. Detecting potential collisions may comprise accessing a collision detection model generated using the acquired sensor data. As used herein, a "collision detection model" refers to a kinematic object model of objects in a vicinity of the vehicle. The collision detection model may further comprise object position, orientation, size, and so on. In some embodiments, the collision detection model further comprises object weight estimates, maneuverability estimates, and so on. The collision detection model may comprise kinematics of objects relative to a particular frame of reference, such as relative position, velocity, acceleration, closing rate, orientation, and so on. The collision detection model may be translated between frames of reference for use in different vehicle collision detection systems. The collision detection model may be generated, in part, by the collision detection system of the vehicle. Alternatively, the collision detection model (and/or portions thereof) may be generated by other vehicles.

Collision detection systems may be configured to acquire sensor data from one or more sources, including, but not limited to: a sensing system of the collision detection system, sensing systems of other vehicles, and/or other external sources. In some embodiments, the collision detection system determines kinematic properties of objects using sensor data acquired by one or more sources. The collision detection system may combine sensor data to refine kinematic properties of an object, determine object position, orientation, size, and so on. The collision detection system may generate a collision detection model using the acquired sensor data. The collision detection system may coordinate with other vehicles to share collision detection data, such as sensor data, the collision detection model, and so on.

The collision detection system may be further configured to acquire auxiliary data from one or more other vehicles. Auxiliary data may comprise "self-knowledge," such as vehicle size, orientation, position, speed, and so on. The auxiliary data may comprise processed sensor data, such as speedometer readings, positioning system information, time information, and so on. In some embodiments, the collision detection system may use auxiliary data to combine sensor data and/or generate the collision detection model.

In some embodiments, the collision detection system may not utilize a sensing system, and may rely on sensor data acquired by other vehicles to detect potential collisions. Alternatively, or in addition, the collision detection system may fuse sensor data acquired using an internal sensing system with sensor data acquired from one or more external sources (e.g., other vehicles). Fusing the sensor data may comprise translating the sensor data into a suitable coordinate system and/or frame of reference, aligning the sensor data, weighting the sensor data, and so on. Fusing the sensor data may comprise weighting the sensor data, as described above.

The collision detection system may be further configured to coordinate sensor operation. In some embodiments, the collision detection system may coordinate sensor operation with other sensing systems to form a composite sensing system. The composite sensing system may comprise sensors of two or more vehicles. The composite sensing system may comprise one or more of: a multistatic sensor, a bistatic sensor, a monostatic sensor, and the like. The collision detection system may configure the sensing system to operate as a passive sensor (e.g., receiving detection signals originating from other vehicles), an active sensor (e.g., transmitting detection signals to be received at other vehicles), and/or a combination of active and passive operation.

The collision detection system may be configured to store monitoring data on a persistent storage device. Alternatively, or in addition, the collision detection system may transmit monitoring data to one or more network-accessible services. The monitoring data may comprise data pertaining to vehicle kinematics (and/or vehicle operation) before, during, and after a collision. The monitoring data may comprise sensor data, collision detection modeling data, and so on. The monitoring data may comprise time and/or location reference auxiliary data, vehicle identifying information, and so on. The monitoring data may be secured, such that the authenticity and/or source of the monitoring data can be verified.

A network accessible service may be configured to aggregate monitoring data from a plurality of vehicles. The network-accessible service may index and/or arrange monitoring data by time, location, vehicle identity, and the like. The network-accessible service may provide access to the monitoring data to one or more requesters via the network. Access to the monitoring data may be predicated on consideration, such as a payment, bid, reciprocal data access (to monitoring data of the requester), or the like.

DETAILED DESCRIPTION

Figure 1:
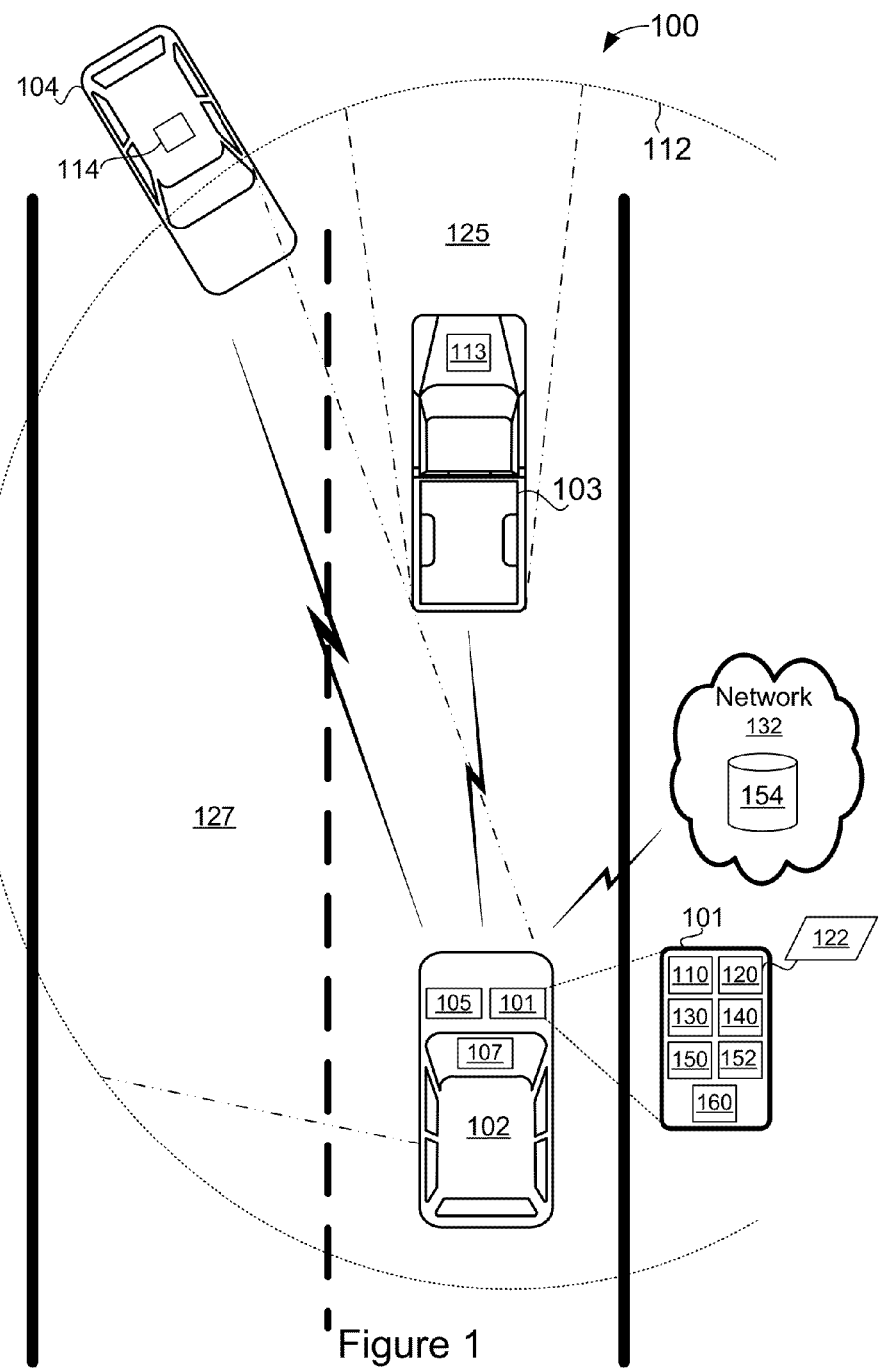
FIG. 1 depicts one embodiment of a collision detection system.

Some of the infrastructure that can be used with embodiments disclosed herein is already available, such as: general-purpose computers, RF tags, RF antennas and associated readers, cameras and associated image processing components, microphones and associated audio processing components, computer programming tools and techniques, digital storage media, and communication networks. A computing device may include a processor, such as a microprocessor, microcontroller, logic circuitry, or the like. The processor may include a special purpose processing device, such as application-specific integrated circuits (ASIC), programmable array logic (PAL), programmable logic array (PLA), programmable logic device (PLD), field programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or other machine-readable storage medium.

Various aspects of certain embodiments may be implemented using hardware, software, firmware, or a combination thereof. As used herein, a software module or component may include any type of computer instruction or computer executable code located within or on a machine-readable storage medium. A software module may, for instance, comprise one or more physical or logical blocks of computer instructions, which may be organized as a routine, a program, an object, a component, a data structure, etc. that performs one or more tasks or implements particular abstract data types.

In certain embodiments, a particular software module may comprise disparate instructions stored in different locations of a machine-readable storage medium, which together implement the described functionality of the module. Indeed, a module may comprise a single instruction or many instructions, and may be distributed over several different code segments, among different programs, and across several machine-readable storage media. Some embodiments may be practiced in a distributed computing environment where tasks are performed by a remote processing device linked through a communication network.

In the exemplary embodiments depicted in the drawings, the size, shape, orientation, placement, configuration, and/or other characteristics of tags, computing devices, advertisements, cameras, antennas, microphones, and other aspects of mobile devices are merely illustrative. Specifically, mobile devices, computing devices, tags, and associated electronic components may be manufactured at very small sizes and may not necessarily be as obtrusive as depicted in the drawings. Moreover, image, audio, and RF tags, which may be significantly smaller than illustrated, may be less intrusively placed and/or configured differently from those depicted in the drawings.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

A vehicle may comprise a collision detection system that is configured to detect potential collisions involving the vehicle and/or other objects in proximity to the vehicle. The objects may include, but are not limited to: pedestrians, animals, vehicles, road hazards, road features, and the like. The collision detection system may be configured to acquire sensor data using a sensing system of the vehicle and/or a sensing system of one or more other vehicles. The collision detection system may use the acquired sensor data to detect potential collisions. Detecting potential collisions may comprise accessing a collision detection model generated using the acquired sensor data. As used herein, a "collision detection model" refers to a kinematic object model of objects in a vicinity of the vehicle. The collision detection model may further comprise object position, orientation, size, and so on. In some embodiments, the collision detection model further comprises object weight estimates, maneuverability estimates, and so on. The collision detection model may comprise kinematics of objects relative to a particular frame of reference, such as relative position, velocity, acceleration, closing rate, orientation, and so on. The collision detection model may be translated between frames of reference for use in different vehicle collision detection systems. The collision detection model may be generated, in part, by the collision detection system of the vehicle. Alternatively, the collision detection model (and/or portions thereof) may be generated by other vehicles.

Collision detection systems may be configured to acquire sensor data from one or more sources, including, but not limited to: a sensing system of the collision detection system, sensing systems of other vehicles, and/or other external sources. In some embodiments, the collision detection system determines kinematic properties of objects using sensor data acquired by one or more sources. The collision detection system may combine sensor data to refine and/or determine kinematic information pertaining to an object, such as object acceleration, velocity, position, orientation, size, and so on. The collision detection system may generate a collision detection model using the acquired sensor data. The collision detection system may coordinate with other vehicles to share collision detection data, such as sensor data, the collision detection model, and so on.

The collision detection system may be further configured to acquire auxiliary data from one or more other vehicles. Auxiliary data may comprise "self-knowledge," such as vehicle size, orientation, position, speed, and so on. The auxiliary data may comprise processed sensor data, such as speedometer readings, positioning system information, time information, and so on. In some embodiments, the collision detection system may use auxiliary data to combine sensor data and/or generate the collision detection model.

In some embodiments, the collision detection system may not utilize a sensing system, and may rely on sensor data acquired by other vehicles to detect potential collisions.

Alternatively, or in addition, the collision detection system may fuse sensor data acquired using an internal sensing system with sensor data acquired from one or more external sources (e.g., other vehicles). Fusing the sensor data may comprise translating the sensor data into a suitable coordinate system and/or frame of reference, aligning the sensor data, weighting the sensor data, and so on. Fusing the sensor data may comprise weighting the sensor data, as described above.

The collision detection system may be further configured to coordinate sensor operation. In some embodiments, the collision detection system may coordinate sensor operation with other sensing systems to form a composite sensing system. The composite sensing system may comprise sensors of two or more vehicles. The composite sensing system may comprise one or more of: a multistatic sensor, a bistatic sensor, a monostatic sensor, or the like. The collision detection system may configure the sensing system to operate as a passive sensor (e.g., receiving detection signals originating from other vehicles), an active sensor (e.g., transmitting detection signals to be received at other vehicles), and/or a combination of active and passive operation.

The collision detection system may be configured to store monitoring data on a persistent storage device. Alternatively, or in addition, the collision detection system may transmit monitoring data to one or more network-accessible services. The monitoring data may comprise data pertaining to vehicle kinematics (and/or vehicle operation) before, during, and after a collision. The monitoring data may comprise sensor data, collision detection modeling data, and so on. The monitoring data may comprise time and/or location reference auxiliary data, vehicle identifying information, and so on. The monitoring data may be secured, such that the authenticity and/or source of the monitoring data can be verified.

A network accessible service may be configured to aggregate monitoring data from a plurality of vehicles. The network-accessible service may index and/or arrange monitoring data by time, location, vehicle identity, or the like. The network-accessible service may provide access to the monitoring data to one or more requesters via the network. Access to the monitoring data may be predicated on consideration, such as a payment, bid, reciprocal access (to monitoring data of the requester), or the like.

FIG. 1 is a block diagram 100 depicting one embodiment of a collision detection system 101. The collision detection system 101 may be deployed within a ground vehicle 102, such as a car, truck, bus, or the like. The collision detection system 101 may comprise a sensing system 110, a processing module 120, a communication module 130, a vehicle interface module 140, a storage module 150, and a coordination module 160. The sensing system 110 may be configured to acquire information pertaining to objects within a detection range 112 of the vehicle 102. The processing module 120 may use information obtained by the sensing system 110 (and/or other sources of sensor data) to detect potential collisions. Detecting a potential collision may comprise identifying objects involved in the potential collision, determining a time frame of the collision (e.g., time to the collision), and so on. The communication module 130 may be used to communicate with other vehicles (e.g., vehicles 103 and/or 104), emergency service entities, a network 132, network-accessible services 154, and the like. The storage module 150 may be used to store a configuration of the collision detection system 101, operating conditions of the vehicle 102 and/or pericollisional information, and so on. The coordination module 160 may be configured to coordinate operation of the collision detection system 101 and/or sensing system 110 with other vehicles 103,104.

The sensing system 110 may be configured to acquire information pertaining to objects that could pose a collision risk to the vehicle 102 (and/or other vehicles 103, 104). The sensing system 110 may be further configured to acquire information pertaining to the operation of the vehicle 102, such as orientation, position, velocity, acceleration, and so on. In some embodiments, the sensing system 110 is configured to acquire kinematic information. As used herein, kinematics refers to object motion characteristics; kinematic information may include, but is not limited to: velocity, acceleration, orientation, and so on. Kinematic information may be expressed using any suitable coordinate system and/or frame of reference. Accordingly, kinematic information may be represented as component values, vector quantities, or the like, in a Cartesian coordinate system, a polar coordinate system, or the like. Furthermore, kinematic information may be relative to a particular frame of reference; for example; kinematic information may comprise object orientation, position, velocity, acceleration (e.g., closing rate), and so on relative to an orientation, position, velocity, and/or acceleration of a particular vehicle 102, 103, and/or 104.

The sensing system 110 may comprise one or more active and/or passive sensors, which may include, but are not limited to, one or more electro-magnetic sensing systems (e.g., radar sensing systems, capacitive sensing systems, etc.), electro-optical sensing systems (e.g., laser sensing system, Light Detection and Ranging (LIDAR) systems, etc.), acoustic sensing systems, ultrasonic sensing systems, magnetic sensing systems, imaging systems (e.g., cameras, image processing systems, stereoscopic cameras, etc.), and the like. The collision detection system 101 may further comprise sensors for determining the kinematics of the vehicle 102 (e.g., "self-knowledge"). Accordingly, the sensing system 110 may comprise one or more speedometers, accelerometers, gyroscopes, information receiving systems (e.g., Global Positioning System (GPS) receiver), wireless network interface, etc.), and the like. Alternatively, or in addition, the collision detection system 101 may comprise (or be communicatively coupled to) a control system 105 of the vehicle 102. As used herein, a vehicle "control system" refers to a system for providing control inputs to a vehicle, such as steering, braking, acceleration, and so on. The collision detection system 101 may incorporate portions of the vehicle control system 105, such as a sensor for determining velocity, acceleration, braking performance (e.g., an anti-lock braking system), and the like. The collision detection system 101 may be further configured to monitor control system inputs 105 to predict changes to vehicle kinematics (e.g., predict changes to acceleration based upon operator control of accelerator and/or braking inputs). Although particular examples of sensing systems are provided herein, the disclosure is not limited in this regard and could incorporate any sensing system 110 comprising any type and/or number of sensors.

The sensing system 110 may be configured to provide sensor data to other vehicles 103, 104 and/or receive sensor data from other vehicles 103, 104. In some embodiments, the sensing system 110 may coordinate sensor operation with other vehicles; for example, the sensing system 110 may act as a transmitter for one or more other sensing systems (not shown), and/or vice versa.

The sensing system 110 may be capable of acquiring information pertaining to objects within a detection range 112 of the vehicle 102. As used herein, a "detection range" of the sensing system 110 refers to a range at which the sensing system 110 is capable of acquiring (and/or configured to acquire) object information. As used herein, the detection range 112 of the sensing system 110 may refer to a detection envelope of the sensing system 110. In some embodiments, the detection range 112 may be more limited than the maximum detection range of the sensing system 110 (the maximum range at which the sensing system 110 can reliably acquire object information). The detection range 112 may be set by user configuration and/or may be determined automatically based upon operating conditions of the vehicle 102, such as vehicle velocity and/or direction, velocity of other objects, weather conditions, and so on. For example, the detection range 112 may be reduced in response to the vehicle 102 traveling at a low velocity and may expand in response to the vehicle 102 traveling at higher velocities. Similarly, the detection range 112 may be based upon the kinematics of other objects in the vicinity of the vehicle 102. For example, the detection range 112 may expand in response to detecting another vehicle 103 travelling at a high velocity relative to the vehicle 102, even though the vehicle 102 is traveling at a low velocity.

In some embodiments, the sensing system 110 may comprise directional sensors (e.g., a beam forming radar, phased array, etc.). The collision detection system 101 may shape and/or direct the detection range 112 of the sensing system 110 in response to operating conditions. For example, when the vehicle 102 is travelling forward at a high velocity, the detection range 112 may be directed toward the front of the vehicle 102; when the vehicle 102 is turning, the detection range 112 may be steered in the direction of the turn; and so on.

The collision detection system 101 may cooperate with other vehicles using the communication module 130. The communication module 130 may include, but is not limited to, one or more: wireless network interfaces, cellular data interfaces, satellite communication interfaces, electro-optical network interfaces (e.g., infrared communication interfaces), and the like. The communication module 130 may be configured to communicate in point-to-point "ad-hoc" networks and/or infrastructure networks 132, such as an Internet Protocol network (e.g., the Internet, a local area network, a wide area network, or the like).

In some embodiments, the collision detection system 101 may be configured to coordinate with other vehicles (e.g., other sensing systems and/or other collision detection systems). The coordination may comprise acquiring sensor data from other entities (e.g., other vehicles 103, 104) and/or providing sensor data acquired by the sensing system 110 to other entities. The coordination may further comprise sharing collision detection data, such as portions of a collision detection model 122, collision detection data and/or alerts, and so on.

The coordination may allow the collision detection system 101 to acquire sensor data pertaining to areas outside of the detection range 112 of the sensing system 110 (e.g., expand the detection range 112 of the collision detection system). Similarly, the collision detection system 101 may acquire sensor data pertaining to areas that are inaccessible to the sensing system 110 (e.g., areas that are obscured by other objects). For example, as depicted in FIG. 1, the position of vehicle 103 may prevent the sensing system 110 from reliably acquiring sensor data pertaining to area 125. The collision detection system 101 may acquire sensor data pertaining to area 125 from another source, such as a sensing system 113 of vehicle 103 and/or the sensing system 114 of vehicle 104. As described below, sensor data coordination may further comprise determining and/or refining kinematic information (e.g., vector components) and determining and/or refining object position (e.g., by triangulating sensor data), size, angular extent, angle-dependent range, orientation, and so on.

The collision detection system 101 may be further configured to provide sensor data acquired by the sensing system 110 to other entities, such as the vehicles 103, 104. The collision detection system 101 may make sensor data available via the communication module 130 (e.g., may broadcast sensor data). Alternatively, or in addition, the collision detection system 101 may provide sensor data (and/or other information related to the collision detection system 101) in response to requests from other entities (e.g., via a point-to-point communication mechanism).

In some embodiments, the collision detection system may be configured to coordinate operation with other entities using, inter alia, the coordination module 160. For example, the sensing system 110 may be capable of obtaining reliable, accurate information pertaining to objects in a particular area 127, but may not be capable of reliably obtaining information pertaining to objects in other areas (e.g., area 125). The collision detection system 101 may coordinate with other sensing systems 113 and/or 114 to provide those sensing systems 113, 114 with sensor data pertaining to objects in area 127. In exchange, the other sensing systems 113, 114 may provide the collision detection system 101 with sensor data pertaining to objects in other areas, such as area 125. This coordination may comprise the collision detection system 101 configuring the detection range 112 of the sensing system 110 (e.g., by beam forming, steering, or the like) to acquire information pertaining to area 127 to the exclusion of other areas, which will be provided by the sensing systems 113, 114.

In some embodiments, the collision detection system 101 may coordinate sensor operation and/or configuration with other sensing systems 113, 114. As described in greater detail below, the coordination module 160 may configure the sensing system 110 to: act as a transmitter for other sensing systems 113, 114 (e.g., in a bistatic and/or multistatic sensor configuration); act as a receiver to detect a sensor signal transmitted by one or more other sensing systems 113, 114; act as a combination transmitter/receiver in combination with other sensing systems 113, 114; and so on.

The collision detection system 101 may further comprise a processing module 120, which may use the information acquired by the sensing system 110 (and/or obtained from other sources) to detect potential collisions. The processing module 120 may comprise one or more processors, including, but not limited to: a general-purpose microprocessor, a microcontroller, logic circuitry, an ASIC, an FPGA, PAL, PLD, PLA, and the like. The processing module 120 may further comprise volatile memory, persistent, machine-readable storage media 152 and the like. The persistent machine-readable storage media 152 may comprise machine-readable storage medium configured to cause the processing module 120 to operate and/or configure the sensing system 110, coordinate with other collision detection systems (e.g., via the communication and/or coordination modules 130, 160), detect potential collisions, and so on, as described herein.

The processing module 120 may be configured to detect potential collisions. The processing module 120 may detect potential collisions using information obtained from any number of sources, including, but not limited to: sensor data acquired from the sensing system 110; sensor data acquired from and/or in cooperation with other sensing systems (e.g., sensing systems 113, 114); collision detection data acquired from other collision detection systems; information received via the communication module 130 (e.g., from a public safety entity, weather service, or the like); and so on.

The processing module 120 may detect potential collisions using any suitable detection technique. In some embodiments, the processing module 120 detects potential collisions using a collision detection model 122. As used herein, a "collision detection model" refers to a model of object kinematics. The collision detection model may include, but is not limited to: object size, position, orientation, velocity, acceleration (e.g., closing rate), angular extent, angle-dependent range, and so on. The kinematics of the collision detection model may be relative to the vehicle 102 (e.g., relative velocity, acceleration, and so on). Alternatively, the collision detection model may incorporate the kinematics of the vehicle 102 and/or may be defined in another frame of reference (e.g., GPS position, frame of reference of another vehicle 103,104, or the like). The processing module 120 may use the collision detection model 112 to extrapolate and/or predict object kinematics, which may indicate potential object collisions (e.g., object intersections within the collision detection model), the time to a potential collision, impact velocity of the potential collision, forces involved in a potential collision, a potential result of a collision, and so on.

The collision detection model 122 may further comprise information pertaining to current operating conditions, such as road conditions, visibility, and so on. For example, the collision detection model 122 may comprise information pertaining to the condition of the operating surface (e.g., roadway), such as whether the roadway is muddy, wet, icy, snowy, or the like. The processing module 120 may use current operating condition information to estimate the probability (and/or ability) of objects to maneuver to, inter alia, avoid potential collisions (e.g., turn, decelerate, and so on).

In some embodiments, the collision detection model 122 may further comprise predictive information. For example, the collision detection model 122 may comprise estimates of object size, weight, and so on. The predictive information may be used to determine object momentum and other characteristics, which may be used to determine a potential result of a collision (e.g., object kinematics after a potential collision has occurred). For example, in the FIG. 1 example, the collision detection system 101 may determine a potential result of a collision between vehicles 103 and 104, which may comprise estimating kinematics of the vehicles 103, 104 after the potential collision has occurred.

The collision detection model 122 may further comprise collision avoidance information, which may comprise instructions on how to avoid potential collisions detected by the processing module 120. The collision avoidance information may pertain to the vehicle 102 and/or other vehicles 103, 104. For example, the collision avoidance information may comprise information for avoiding a potential collision between vehicles 103 and 104. The collision avoidance information may further comprise information to allow the vehicle 102 to avoid becoming involved in the collision (e.g., avoid a potential result of the collision).

The collision detection system 101 may be configured to take one or more actions in response to detecting a potential collision. Such actions may include, but are not limited to: alerting the operator of the vehicle 102 to the potential collision, determining a collision avoidance action, determining a potential result of the collision (e.g., estimate object kinematics after the collision), determining actions to avoid the potential result, automatically taking one or more collision avoidance actions, transmitting the collision detection model 122 to other vehicles (and/or a portion thereof), coordinating a response to the potential collision with other vehicles, contacting an emergency services entity, and so on.

The coordination module 160 may make portions of the collision detection model 122 available to other vehicles 103, 104 (via the communication module 130). Alternatively, or in addition, the coordination module 160 may be configured to receive collision detection data from other vehicles 103, 104. The collision detection data may comprise sensor data, a collision detection model (and/or portions thereof), vehicle kinematics, collision detections, avoidance information, and so on.

The collision detection system 101 may comprise and/or be communicatively coupled to human-machine interface components 107 of the vehicle 102. The human-machine interface components 107 may include, but are not limited to: visual display components (e.g., display screens, heads-up displays, or the like), audio components (e.g., a vehicle audio system, speakers, or the like), haptic components (e.g., power steering controls, force feedback systems, or the like), and so on.

The collision detection system 101 may use the human-machine interface components 107 to alert an operator of the vehicle 102 to a potential collision. The alert may comprise one or more of: an audible alert (e.g., alarm), a visual alert, a haptic alert, or the like. In some embodiments, the alert may comprise collision avoidance instructions to assist the operator in avoiding the potential collision (and/or a result of a potential collision involving other vehicles). The avoidance instructions may be provided as one or more audible instructions, visual cues (e.g., displayed on a heads-up display), haptic stimuli, or the like. For example, collision avoidance instructions may be conveyed audibly through a speaker system of the vehicle (e.g., instructions to "veer left"), visually through icons on a display interface (e.g., a turn icon, brake icon, release brake icon, etc.), and/or by haptic feedback (e.g., vibrating a surface, actuating a control input, and so on). Although particular examples of alerts are described herein, the disclosure is not limited in this regard and could be adapted to incorporate any suitable human-machine interface components 107.

As discussed above, the collision detection system 101 may be configured to take one or more automatic collision avoidance actions in response to detecting a potential collision. The collision avoidance actions may include, but are not limited to: accelerating, decelerating, turning, actuating vehicle systems (e.g., lighting systems, horn, etc.), and so on. Accordingly, the collision detection system 101 may be communicatively coupled to the control system 105 of the vehicle 102, and may be capable of providing control inputs thereto. The automatic collision avoidance actions may be configured to prevent the potential collision, avoid a result of the potential collision (e.g., a collision involving other vehicles), and so on. The automatic collision avoidance actions may be determined in cooperation with other vehicles. For example, the collision detection system 101 may cooperate with the vehicle 103 to determine collision avoidance actions (or instructions) that allow both vehicles 102, 103 to avoid the potential collision, while also avoiding each other.

The collision detection system 101 may be configured to implement the automatic collision avoidance actions without the consent and/or intervention of the vehicle operator. Alternatively, or in addition, the collision detection system 101 may request consent from the operator before taking the automatic collision avoidance actions. The human-machine interface module 107 may comprise one or more inputs configured to allow the vehicle operator to indicate consent, such as a button on a control surface (e.g., steering wheel), an audio input, a visual input, or the like. The consent may be requested at the time a potential collision is detected and/or may be requested a priori, before a potential collision is detected. The consent may expire after a pre-determined time and/or in response to certain, pre-determined conditions (e.g., after the potential collision has been avoided, after the vehicle 102 is shut down, etc.). Accordingly, the collision detection system 101 may be configured to periodically re-request the consent of the vehicle operator. For example, the collision detection system 101 may request consent to implement automatic collision avoidance actions each time the vehicle 102 is started.

The collision detection system 101 may be configured such that the automatic collision avoidance actions cannot be overridden by the vehicle operator. Accordingly, the collision detection system 101 may be configured to "lock out" the vehicle operator from portions of the control system 105. Access to the vehicle control system 105 may be restored after the automatic collision avoidance actions are complete and/or the collision detection system 101 determines that the potential collision has been avoided. The collision detection system 101 may be configured to "lock out" the vehicle operator from all vehicle control operations. Alternatively, the vehicle operator may be allowed limited access to the control system 105. For example, the control system 105 may accept operator inputs that do not interfere and/or conflict with the automatic collision avoidance actions (e.g., the vehicle operator may be allowed to provide limited steering input, but not acceleration/deceleration).

Alternatively, the collision detection system 101 may be configured to allow the vehicle operator to override one or more of the automatic collision avoidance actions. In response to an override, the collision detection system 101 may stop implementing automatic collision avoidance actions and may return control to the vehicle operator. An override may comprise the vehicle operator providing an input to the control system 105 (or other human-machine interface component 107). In another example, the collision detection system 101 may implement the automatic collision avoidance actions by actuating controls of the vehicle 102 (e.g., turning the steering wheel), and an override may comprise the vehicle operator resisting or counteracting the automatic control actuations.

In some embodiments, the collision detection system 101 may be capable of preemptively deploying and/or configured to preemptively deploy safety systems of the vehicle 102. For example, the collision detection system 101 may be configured to deploy one or more airbags before the impact of the collision occurs. The collision detection system 101 may be further configured to adapt the deployment of the safety systems to the imminent collision (e.g., adapt safety system deployment in accordance with the location on the vehicle 102 where a collision impact is to occur).

The collision detection system 101 may continue to monitor object kinematics after detecting a potential collision and taking any of the actions described above. The collision detection system 101 may continue to revise and/or update the actions described above in response to changing kinematics (e.g., the result of one or more collisions, the actions of other vehicles 103,104, and the like).

The collision detection system 101 may further comprise a storage module 150 that is configured to store information pertaining to the capabilities, configuration, and/or operating state of the collision detection system 101 (and/or vehicle 102). The storage module 150 may comprise persistent, machine-readable storage media 152, such as hard disks, solid-state storage, optical storage media, or the like. Alternatively, or in addition, the storage module 150 may be configured to store data in a network-accessible service 154, such as a cloud storage service or the like (via the communication module 130).

The storage module 150 may be configured to store any information pertaining to the vehicle 102, which may include, but is not limited to: kinematics of the vehicle 102, operator control inputs (e.g., steering, braking, etc.), the collision detection model 122 (e.g., kinematics of other vehicles, collision detections, etc.), actions taken in response to detecting potential collisions, operator override of automatic collision avoidance actions, communication with other vehicles, and so on. Accordingly, the storage module 150 may act as a "black box" detailing the operating conditions of the vehicle 102 and/or other peri-collisional circumstances.

The storage module 150 may be configured to prevent unauthorized access to and/or modification of stored information. Accordingly, the storage module 150 may be configured to encrypt information for storage. The storage module 150 may also provide for validating authenticity of stored information; for example, the storage module 150 may be configured to cryptographically sign stored information.

The coordination module 160 may be configured to coordinate collision detection operations with other entities, such as the vehicles 103, 104. Coordination may comprise cooperative sensor configuration, sharing sensor data, sharing processed information, and so on. The coordination may be established on an ad-hoc basis (e.g., one or more vehicles 102, 103, and/or 104 may broadcast portions of the collision detection model 122 and/or other collision detection data), may be established in response to a request (e.g., a vehicle-to-vehicle coordination), or the like. In some embodiments, collision detection system coordination may be predicated on a payment, reciprocal sharing, or other exchange.

Figure 2A:
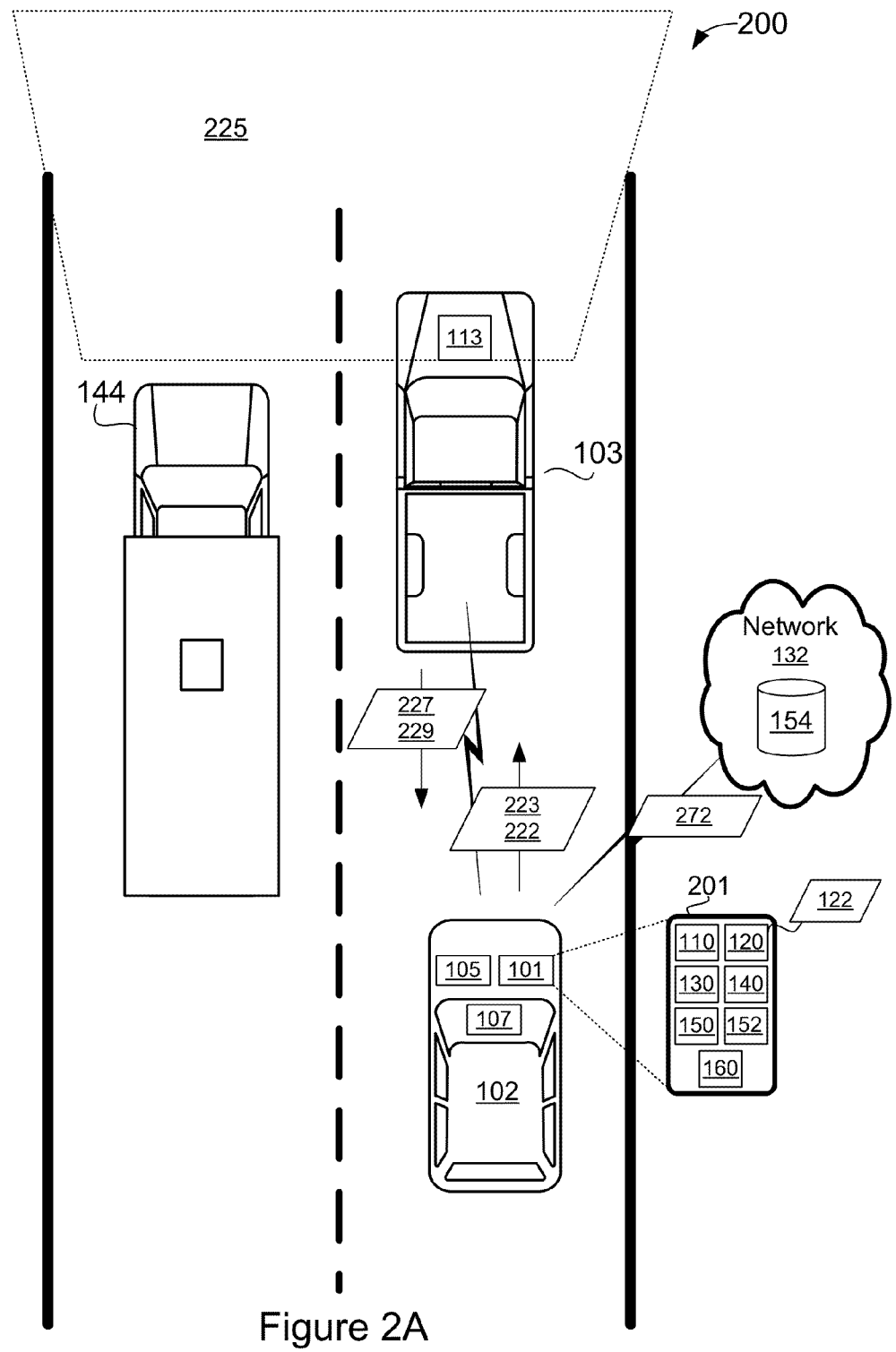
FIG. 2A depicts another embodiment of a cooperative collision detection system.

FIG. 2A is a block diagram 200 depicting another embodiment of a collision detection system 101. An area 225 may be inaccessible to the sensing system 110 of the collision detection system 101. In the FIG. 2A example, the area 225 is inaccessible due to position of the vehicles 103 and 144. In response, the coordination module 160 may be configured to transmit a request 223 for sensor data pertaining to the area 225 (via the communication module 130).

In some embodiments, the request 223 may be transmitted in response to other conditions. For example, the collision detection system 101 may not include a sensing system 110 and/or the sensing system 110 may be inactive (e.g., may be inoperative). The collision detection system 101 may, therefore, rely on sensor data from other sources, such as the vehicle 103, to detect potential collisions. Alternatively, the collision detection system 101 may request sensor data from all available sources, including sensor data pertaining to areas from which the sensing system 110 is capable of acquiring sensor data. The collision detection system 101 may use redundant sensor data to validate and/or refine the sensor data acquired by the sensing system 110.

The request 223 may comprise a request for sensor data pertaining to a particular area 225 and/or may comprise a request for all available sensor data. The request 223 may be directed to a particular entity (e.g., vehicle 103) and/or may be broadcast to any source capable of satisfying the request 223. Accordingly, in some embodiments, the request 223 may comprise establishing a communication link with the vehicle 103 (e.g., discovering the vehicle 103 via one or more network discovery broadcast messages, performing a handshake protocol, and so on).

The request 223 may comprise an offer of compensation in exchange for access to the requested sensor data. Accordingly, the request 223 may comprise a negotiation to establish an acceptable exchange (e.g., an acceptable payment, reciprocal data sharing, or the like). The negotiation may occur automatically in accordance with pre-determined policy, rules, and/or thresholds stored on the persistent, machine-readable storage medium 152. Alternatively, the negotiation may comprise interacting with occupant(s) of the vehicles 102, 103 and/or other entities (e.g., via the network 130). For example, the vehicles 102, 103 may be associated with organizations that have agreed to share collision detection data (e.g., an automobile association, insurance carrier, or the like). In some embodiments, the sensing system 113 of the vehicle 103 may be configured to broadcast the sensor data automatically, such that an explicit request 233 for the sensor data is not required.

The vehicle 103 may provide sensor data 227, which may be received via the communication module 130. The sensor data 227 may comprise sensor data acquired by the sensing system 113 of the vehicle (or acquired by one or more other vehicles or sources (not shown)). The collision detection system 101 may use the sensor data 227 to detect potential collisions, as described above. For example, the processing module 120 may generate a collision detection module that incorporates the sensor data 227. In some embodiments, the vehicle 103 may provide auxiliary data 229 in addition to (and/or in place of) the sensor data 227. The auxiliary data 229 may comprise processed sensor data, such as "self-knowledge" pertaining to the vehicle 103, which may include, but is not limited to: identification, vehicle size, vehicle orientation, vehicle weight, position (absolute position or position relative to the vehicle 102), velocity (e.g., a speedometer reading), acceleration (e.g., accelerometer readings), a time reference (e.g., a time synchronization signal), and so on. The processing module 120 may use the auxiliary data 229 to translate the sensor data 227 into a frame of reference of the vehicle 102 or other suitable frame of reference, as described above. Translating the sensor data 227 may further comprise aligning sensor data (e.g., aligning the sensor data 227 with sensor data acquired by the sensing system 110). Aligning may comprise time shifting and/or time aligning the sensor data 227 relative to other sensor data samples and/or streams. As such, aligning the sensor data 227 may comprise aligning time-stamped sensor data, extrapolating sensor data (e.g., extrapolating a position from velocity and/or orientation, extrapolating velocity from acceleration, and so on), time shifting sensor data, and so on.

In some embodiments, the coordination module 160 may be configured to provide collision detection data 222 to the vehicle 103. The collision detection data 222 may include, but is not limited to: the collision detection model 122 (and/or a portion thereof), sensor data acquired by the sensing system 110, information pertaining to potential collisions detected by the collision detection system 101, auxiliary data pertaining to the vehicle 102, and so on.

Accordingly, in some embodiments, the collision detection system 101 may be configured to aggregate sensor data from multiple sources (e.g., sensing system 110, vehicle 103, and so on), generate a collision detection model 122 using the sensor data (and/or auxiliary data, if any), and provide the collision detection model 122 to other vehicles 103, 144 (by transmitting the collision detection data 222). Accordingly, vehicles in a communication range of the vehicle 102 (communication range of the communication module 130) may take advantage of the collision detection model 122. In some embodiments, one or more vehicles may be configured to re-transmit and/or re-broadcast the collision detection data 222 to other vehicles, which may extend an effective communication range of the collision detection system 101 (e.g., as in an ad-hoc wireless network configuration).

In some embodiments, the collision detection system 101 may be configured to provide and/or store monitoring data 272 to one or more persistent storage systems, such as the network-accessible service 154, persistent, machine-readable storage medium 152, or the like. The monitoring data 272 may include, but is not limited to: collision detection data 222, sensor data used by the collision detection system 101 (sensor information acquired using the sensing system 110, acquired from other sources, such as the vehicle 103, and so on), the collision detection model 122, information pertaining to potential collisions detected by the collision detection system 101, collision alerts generated by the collision detection system 101, diagnostic information pertaining to the vehicle 102 and/or other vehicles 103, 144, operating conditions, location (e.g., GPS coordinates), time information, and so on. The diagnostic information may include, but is not limited to: indications of whether other vehicles 103, 144 comprise collision detection systems and/or are configured to coordinate collision detection with the collision detection system 101, indications of whether other vehicles 103, 144 are capable of communicating with the collision detection system 103 (e.g., capable of receiving collision detection data), actions taken in response to detecting a potential collision and/or alerting other vehicles to a potential collision, and so on.

The monitoring data 272 may be used to reconstruct peri-collisional conditions, such as the kinematics of vehicles 102, 103, and/or 144 before, during, and/or after a collision. The monitoring data 272 may further include information pertaining to the actions (if any) taken by the vehicles 102, 103, and/or 144 in response to detecting a potential collision (e.g., operator control inputs, automatic collision avoidance actions, etc.), and so on. In some embodiments, the monitoring data 272 may comprise timestamps and/or other auxiliary data to allow a location and/or time of the monitoring data 272 to be determined.

The monitoring data 272 may further comprise vehicle identifying information (e.g., information identifying the vehicle 102, 103, and/or 144), such as a vehicle identification number (VIN), license plate information, registration information, vehicle make, model, and color designations, and so on. The vehicle identifier(s) may be derived from sensor data acquired by the sensing system 110 (or other vehicle 103) and/or may be received as auxiliary data from one or more other vehicles; for instance the vehicles 102, 103, and/or 144 may be configured to provide identifying information to other vehicles (e.g., broadcast identifying information via a network, near-field communication, BLUETOOTH®, or the like). In other examples, one or more of the vehicles 102, 103, and/or 144 may comprise a Radio Frequency Identifier (RFID), which may be interrogated by an RFID reader of the sensing system 110. Other objects may comprise identifying information, such as pedestrians, buildings, road features (e.g., street signs, traffic lights, etc.), and so on. These objects may be configured to provide identifying information to one or more of the vehicles 102, 103, and/or 144, which may incorporate the identifying information into the collision detection model 122 and/or monitoring data 272. For example, a person may carry an item that is configured to broadcast and/or provide identifying information (e.g., via RFID), such as the person's name, address, allergies, emergency contact information, insurance carrier, license number, and so on. Similarly, road features may be configured to provide identifying information. For example, a traffic signal may be configured to broadcast location information (e.g., the location of the signal), state information (e.g., red light, green light, etc.), and so on.

As described above, in some embodiments, the monitoring data 272 may be secured to prevent the monitoring data 272 from being modified; for example, the collision detection data 272 may comprise a digital signature, may be encrypted, or the like. The monitoring data 272 may be secured, such that the authenticity and/or source of the monitoring data 272 may be verified.

In some embodiments, a network-accessible service 154 may be configured to store monitoring data 272 from a plurality of different vehicles. The collision construction data 272 may be received via the network 132 and/or extracted from persistent, machine-readable storage media 152 of a vehicle (e.g., vehicle 102). The network-accessible service may index and/or arrange the monitoring data 272 by time, location, vehicle identity, and so on. The network-accessible service 154 may provide monitoring data 272 to a requester based upon a selection criteria (e.g., time, location, identity, etc.). In some embodiments, the network-accessible service 154 may provide consideration for the monitoring data 272 (e.g., a payment, reciprocal access, etc.).

In some examples, the collision detection data 222 may be provided to an emergency services entity in response to detecting a collision. The collision detection data 222 may be used to determine and/or estimate collision kinematics (e.g., impact velocity, impact vectors, etc.), which may be used to estimate forces involved in the collision, probable injury conditions, the final resting location of vehicles (or vehicle occupants) involved in the collision, and so on.

The collision detection system 101 may be further configured to respond to requests for collision detection data 222. In some embodiments, the collision detection system 101 may provide sensor data acquired by the sensing system to one or more other vehicles (e.g., vehicle 103) in response to a request, as described above. In another example, the collision detection system 101 may provide the collision detection model 122 (and/or a portion thereof) to other vehicles and/or entities. The collision detection system 101 may be configured to store collision detection data, such as the collision detection model 122 and/or acquired sensor data to a network-accessible service 154, emergency services entity, traffic control entity, or the like, via the network 132.

Figure 2B:
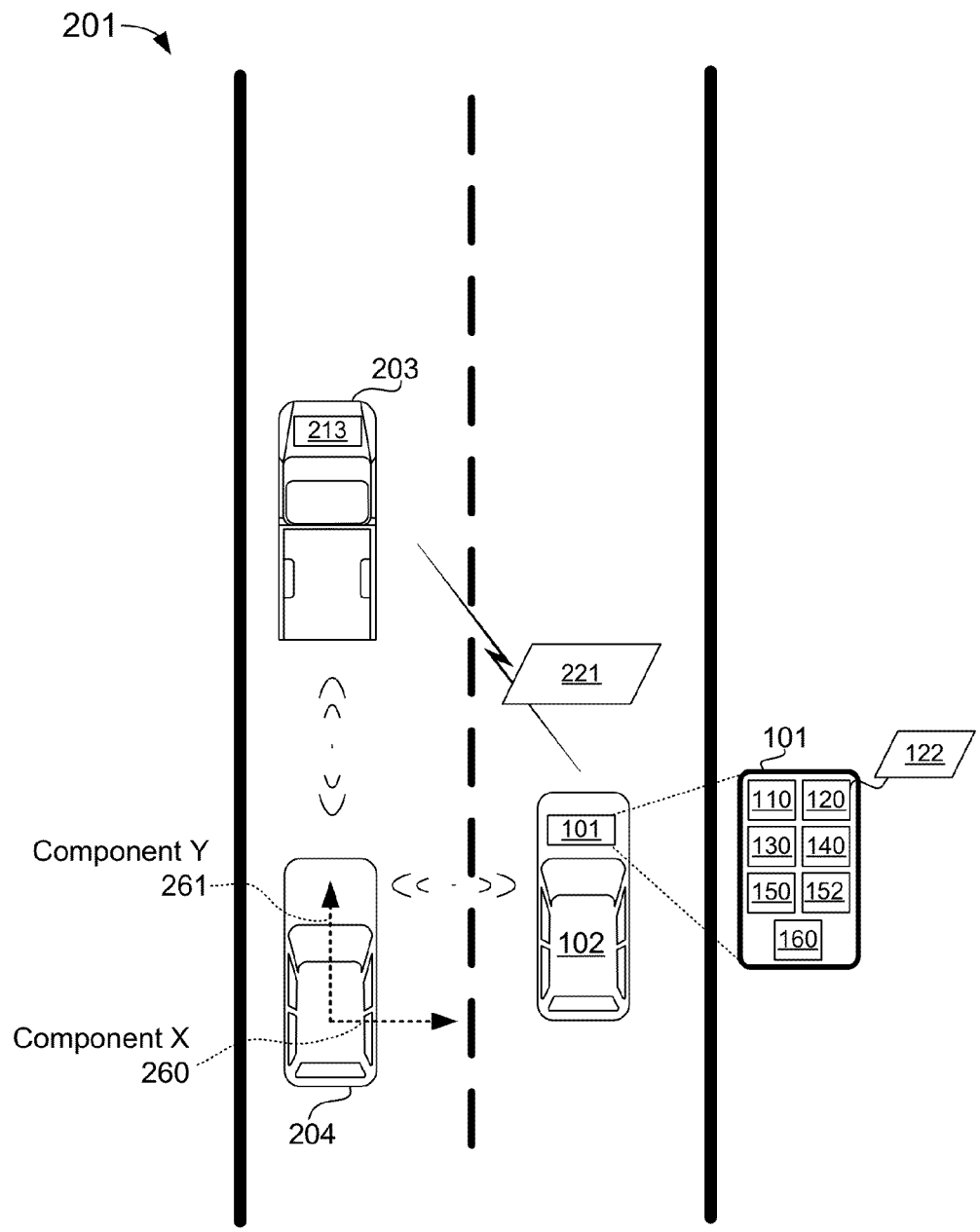
FIG. 2B depicts another embodiment of a cooperative collision detection system.

FIG. 2B is a block diagram 201 depicting another embodiment of a collision detection system 101. In some embodiments, the collision detection system 101 may be configured to combine sensor data to determine different components of object kinematics (e.g., different components of velocity, acceleration, etc.). As described above, kinematic information may be expressed as vector quantities in a particular coordinate system and/or frame of reference (e.g., Cartesian coordinate system, polar coordinate system, or the like). The quantities may be relative to a particular frame of reference (e.g., vehicle 102, 103, etc.). Vector quantities may be deconstructed into one or more component quantities; in a Cartesian coordinate system, a vector quantity may comprise x, y, and/or z component quantities; in a polar coordinate system, a vector quantity may comprise r, theta (range and angle), and/or z component quantities; and so on. In some embodiments, the ability of a sensing system to determine particular components of object kinematics may depend, inter alia, upon the position and/or orientation of the sensing system relative to the object. For example, a Doppler radar may be capable of acquiring data pertaining to certain components of object kinematics, but not others, depending upon an orientation and/or position of the Doppler radar relative to the object.

As illustrated in FIG. 2B, the sensing system 110 of the collision detection system 101 may be positioned and/or oriented relative to the vehicle 204, such that the sensing system 110 is capable of acquiring object kinematics pertaining to component 260 (e.g., the "x axis" component, which corresponds to "side-to-side" range, velocity, and so on). The sensing system 110, however, may not be capable of determining component 261 (e.g., the "y axis" component, which corresponds to "forward" range, velocity, and so on). For example, the sensing system 110 may comprise a Doppler radar, which is effective at determining component 260, but not component 261. Another sensing system 213 of the vehicle 203 may be capable of acquiring object kinematics pertaining to component 261, but not component 260.

The coordination module 160 of the collision detection system 101 may be configured to share sensor data 221 with the vehicle 203, which may comprise providing sensor data acquired by the sensing system 110 (pertaining to component 260) and/or receiving sensor data acquired by the sensing system 213 of the vehicle 203 (pertaining to component 261). The coordination module 160 may be configured to request access to sensor data acquired by the vehicle 203, as described above. The coordination module 160 may be further configured to provide access to sensor data acquired by the sensing system 110, as described above (e.g., in exchange for access to the sensor data acquired by the vehicle 203, a payment, or the like). The sensor data 221 may be shared via the communication module 130, as described above.

The processing module 120 of the collision detection system 101 may "fuse" the sensor data acquired by the sensing system 110 (and pertaining to component 260) with the sensor data acquired from the vehicle 203 (and pertaining to component 261) to develop a more complete and accurate model of the kinematics of the vehicle 204. Fusing the sensor data may comprise translating the sensor data into a common coordinate system and/or frame of reference, weighting the sensor data, and so on. The sensor data may be combined to determine object kinematics and/or may be used to refine other sensor data using component analysis or other suitable processing techniques. In the FIG. 2B example, fusing the sensor data may comprise using the sensor data acquired by the sensing system 110 to determine a component (component 260) of objects kinematics (e.g., side-to-side kinematic characteristics) and using the sensor data acquired by the vehicle 203 to determine object kinematics in component 261 (e.g., forward kinematic characteristics). Fusing may further comprise combining range and/or angle information of the sensor data 221 to determine and/or refine a position of the vehicle 204 relative to the vehicle 102 and/or 203, which may comprise triangulating range and/or angle information of the sensor data. Similarly, fusing the sensor data may comprise determining object size, orientation, angular extent, angle-dependent range, and so on. For example, range information from different sensors may be used to determine position and/or angular orientation (e.g., using intersecting range radii analysis).

Combining the sensor data may further comprise weighting the sensor data. Sensor data may be weighted in accordance with the accuracy of the data (e.g., signal-to-noise ratio), sensor data orientation and/or position relative to a particular object, and so on.

Figure 2C:
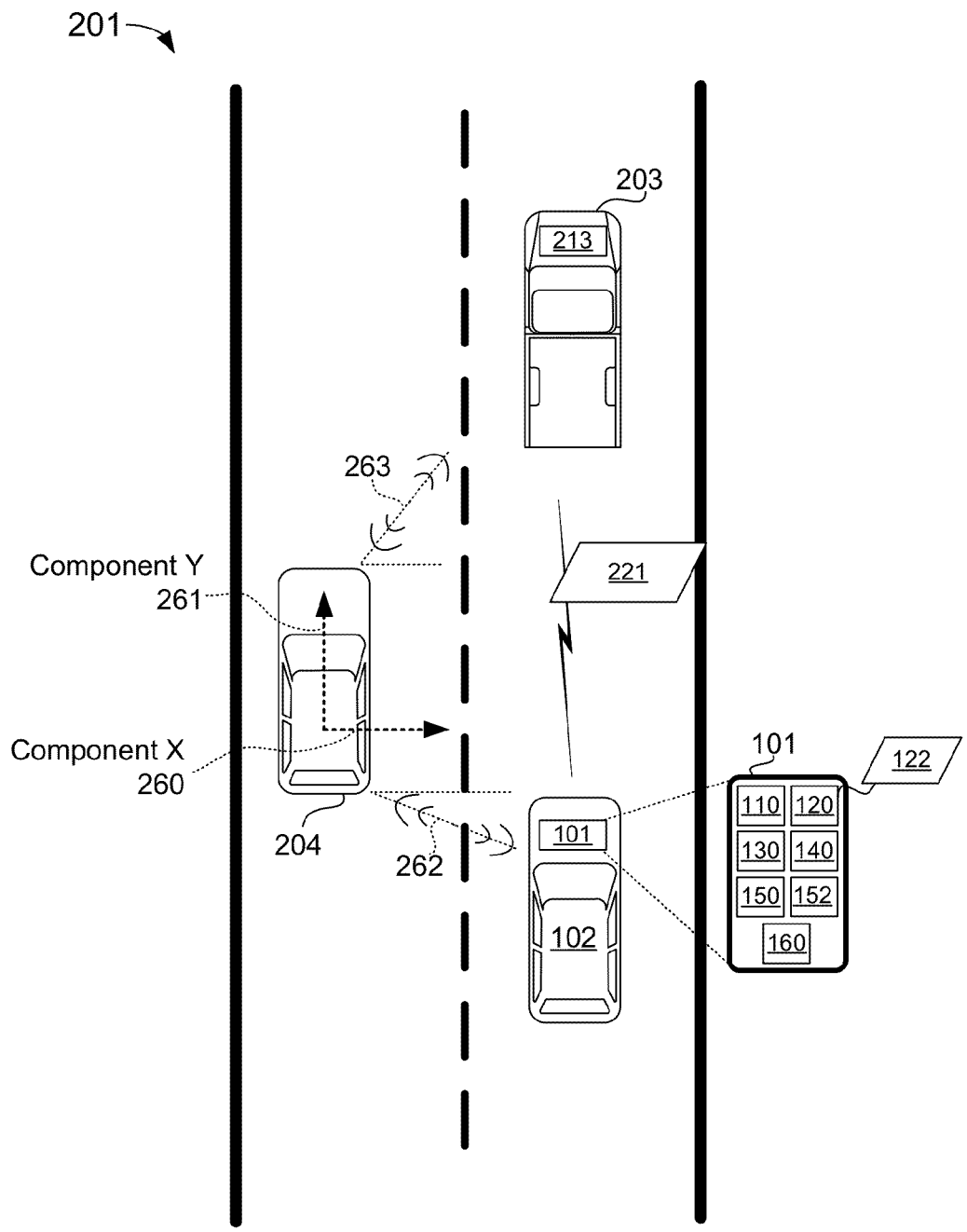
FIG. 2C depicts another embodiment of a cooperative collision detection system.

The combination of sensor data may be determined, inter alia, upon a relative position and/or orientation of the sensing system 110 and/or vehicle 203, as described above. As would be appreciated by one of skill in the art, other sensor orientations may result in different types of sensor data combinations. FIG. 2C is a block diagram of another embodiment of a collision detection system. In the FIG. 2C example, the sensing system 110 and vehicle 203 are at different orientations relative to the vehicle 204. As a result, the sensor data may be fused in a different way. For example, the component 260 may be determined by a combination of the sensor data acquired by the sensing system 110 and the sensor data acquired by the vehicle 203 (as opposed to primarily sensor data acquired by the sensing system 110, as in the FIG. 2B example). The relative contributions of the different sensor data may be based, inter alia, upon the relative orientation (e.g., angles 262, 263) of the vehicles 102 and 203. The combination may update dynamically in response to changes in the relative position and/or orientation of the vehicles 102, 203, and/or 204 (e.g., changes to the angles 262 and/or 263).

In some embodiments, fusing sensor data may further comprise weighting the sensor data. The relative weights of sensor data may correspond to a signal-to-noise ratio of the sensor data, a position and/or orientation of the sensor data to a particular object, and so on. Accordingly, weights may be applied on a per-object basis. Referring back to the FIG. 2B example, weights for the sensor data acquired by sensing system 110 for component 260 may be relatively high (due to the sensing system 110 being ideally positioned to measure component 260), and the weights for the sensor data for component 261 may be low (due to the poor position of the sensing system 110 for measuring component 261).

Figure 3:
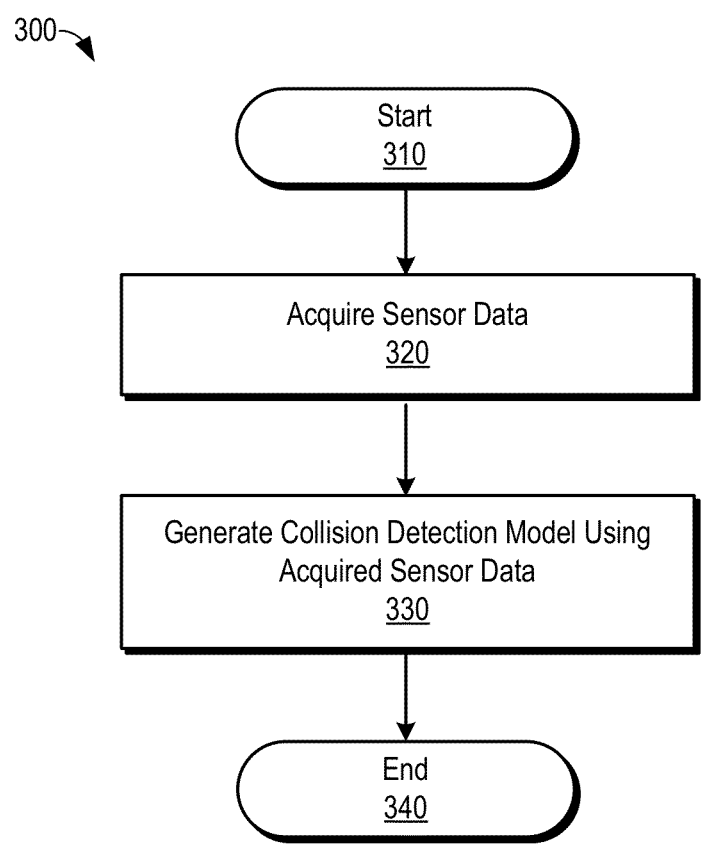
FIG. 3 is a flow diagram of one embodiment of a method for coordinating collision detection.

FIG. 3 is a flow diagram of one embodiment of a method 300 for coordinating collision detection. The method 300 may be implemented by a collision detection system, as described herein. In some embodiments, the method 300 may be embodied as instructions stored on a persistent, machine-readable storage medium (e.g., persistent, machine-readable storage medium 152). The instructions may be configured to cause a processor to perform one or more of the steps of the method 300.

At step 310, the method 300 starts and is initialized, which may comprise loading instructions from a persistent, machine-readable storage medium and accessing and/or initializing resources, such as a sensing system 110, processing module 120, communication module 130, coordination module 160, and so on.

Step 320 may comprise acquiring sensor data at a vehicle 102. The sensor data of step 320 may be acquired from a source that is external to the vehicle 102, such as another vehicle (e.g., sensor data acquired by the sensing system 113 of vehicle 103). The sensor data may be acquired in response to a request and/or negotiation, as described above. Alternatively, the sensor data may be acquired without a request (e.g., the sensor data acquired at step 320 may be broadcast from a source, as described above). In some embodiments, step 320 may further comprise receiving auxiliary data from a source of the sensor data. The auxiliary data may comprise a "self-knowledge" data pertaining to the source of the sensor data, such as size, weight, orientation, position, kinematics, and so on.

In some embodiments, step 320 may comprise fusing the sensor data acquired at step 320 with other sensor data acquired from other sources (e.g., the sensing system 110 of the collision detection system 101). Accordingly, step 330 may comprise translating sensor data into a suitable coordinate system and/or frame of reference (e.g., using auxiliary data of the vehicle 102 and/or the source(s) of the sensor data). Fusing the sensor data may further comprise weighting and/or aligning the sensor data, which may comprise time shifting the sensor data, extrapolating the sensor data, or the like, as described above.

Step 330 may comprise generating a collision detection model using the sensor data acquired at step 320. Generating the collision detection model may comprise determining object kinematics using the sensor data, such as object position, velocity, acceleration, orientation, and so on. Generating the collision detection model may further comprise determining and/or estimating object size, weight, and so on. Step 330 may comprise combining sensor data to determine and/or refine one or more component quantities. For example, step 330 may comprise triangulating range and/or angle information in the sensor data to determine object position, applying intersecting range radii analysis to determine angular orientation, fusing sensor data to determine different components of object kinematics, and so on.

Step 330 may further comprise translating the collision detection model into a suitable coordinate system and/or frame of reference. For example, step 330 may comprise generating a collision detection model in a particular frame of reference (e.g., relative to the vehicle 102). Step 330 may further comprise translating the collision detection model into other coordinate systems and/or frames of reference. For example, step 330 may comprise translating the collision detection model into the frame of reference of another vehicle (e.g., vehicle 103). The translations step 330 (and/or step 320) may be based upon a position, velocity, acceleration, and/or orientation of the source(s) of the sensor data acquired at step 320 and/or a position, velocity, acceleration, and/or orientation of a particular frame of reference.

In some embodiments, step 330 may further comprise detecting a potential collision using the collision detection model and/or taking one or more actions in response to detecting the potential collision, as described above. The method 300 ends at step 340 until additional sensor data is acquired at step 320.

Figure 4:
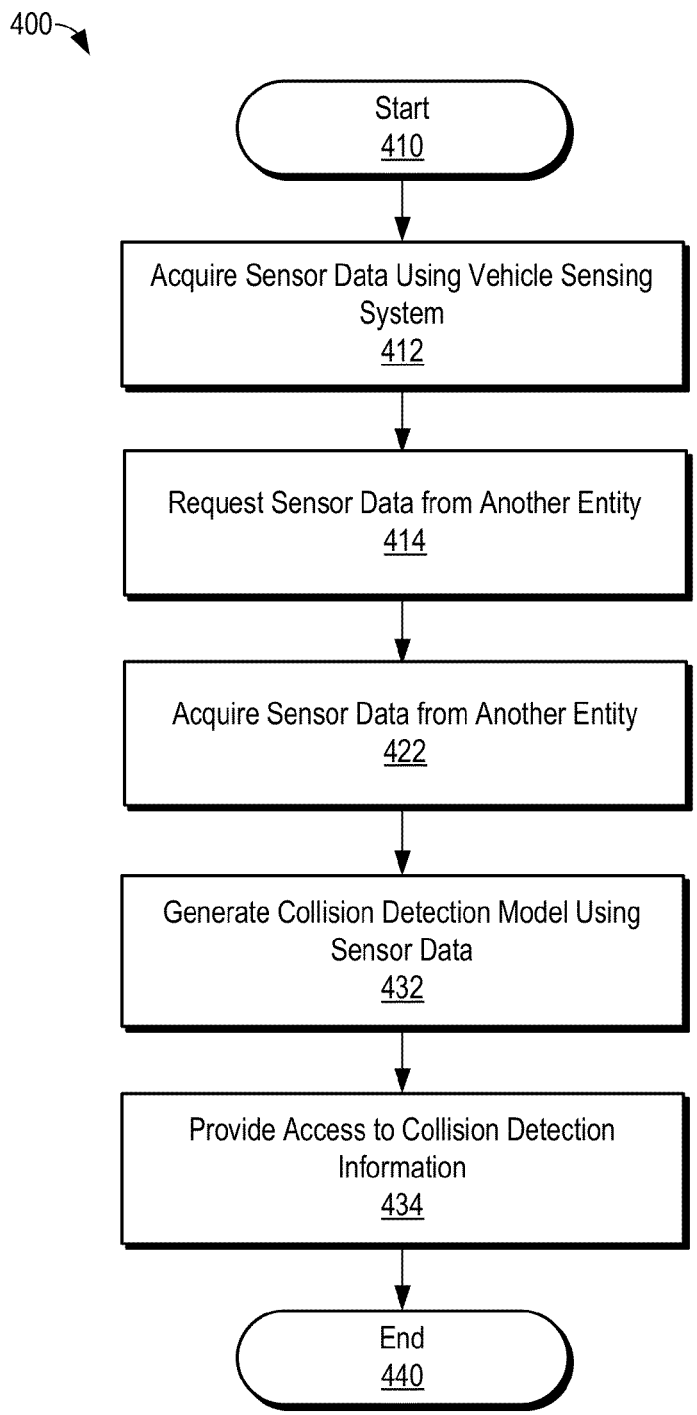
FIG. 4 is a flow diagram of another embodiment of a method for coordinating collision detection.

FIG. 4 is a flow diagram of another embodiment of a method 400 for coordinating collision detection. At step 410 the method 400 starts and is initialized as described above.

Step 412 may comprise acquiring sensor data using a vehicle sensing system 110, as described above. The sensor data of step 412 may be acquired using one or more different types of sensing systems, comprising any number of different sensors.

Step 414 may comprise requesting sensor data from an external entity (e.g., another vehicle 103). The request of step 414 may be made in response to determining that the sensor data of step 412 fails to capture a particular area (e.g., area 125, 225), fails to capture certain kinematic components of an object (e.g., a particular component 261 of object kinematics), and so on. Alternatively, the request of step 414 may be made regardless of the nature of the sensor data acquired at step 412. The requested sensor data may be used to augment and/or refine the sensor data acquired at step 412 and/or sensor data acquired from other sources.

In some embodiments, the request of step 414 may be transmitted to a particular entity (e.g., a particular vehicle 103). Accordingly, step 414 may comprise establishing communication with the entity, which may comprise discovering the entity (e.g., via one or more broadcast messages), establishing a communication link with the entity, and so on. Alternatively, the request of step 414 may not be directed to any particular entity, but may be broadcast to any entity capable of providing sensor data.

The request may identify a particular area of interest (e.g., area 125, 225). The area of interest may be specified relative to the vehicle 102 (the requester) and/or another frame of reference. Accordingly, step 414 may comprise translating information pertaining to the request into another coordinate system and/or frame of reference, as described above. Alternatively, or in addition, the request may identify an object of interest and/or request data acquired at a particular orientation and/or position with respect to an object. The requested data may be used to determine and/or refine kinematic components that are not available to the sensing system 110 of the vehicle 102, as described above.

The request may comprise an offer in exchange for access to the sensor data. The offer may comprise a payment, bid, reciprocal access, collision detection data, or other consideration. Accordingly, in some embodiments, step 414 may comprise negotiating an acceptable exchange using one or more of: pre-determined policy, rules, thresholds, or the like. Step 414 may further comprise receiving acceptance from the requester, the source of the sensor data, and/or another entity (e.g., an association, insurer, or the like), as described above.

Step 422 may comprise acquiring the requested sensor data using the communication module 130, as described above. Although method 400 depicts a request step 414, in some embodiments, the request may 414 may not be required. For example, in some embodiments, the sensor data may be made freely available (e.g., broadcast), such that the sensor data may be acquired at step 422 without an explicit request. Step 422 may comprise translating the acquired sensor data, as described above.

Step 432 may comprise generating a collision detection model using the sensor data acquired using the vehicle sensing system 110 and/or the sensor data acquired from the other vehicle at step 422. Generating the collision detection model may comprise fusing sensor data (e.g., combining the sensor data), determining object kinematics using the fused sensor data, and so on. Generating the collision detection model may further comprise translating the collision detection model into one or more suitable coordinate systems and/or frames of reference. Step 432 may further comprise detecting potential collisions using the collision detection model, which may comprise identifying objects involved in the potential collision, determining a time to the potential collision, determining collision avoidance actions and/or instructions, issuing one or more alerts and/or notifications, and so on.

Step 434 may comprise providing access to collision detection data to one or more other entities (e.g., the source of the sensor data acquired at step 422). Step 434 may comprise providing a portion of the collision detection model generated at step 432 to one or more other vehicles, providing one or more collision detection alerts to other vehicles, providing sensor data to one or more other vehicles, and the like. Step 434 may comprise transmitting the collision detection data to a particular vehicle and/or broadcasting the collision detection data. The collision detection data may comprise auxiliary information, such as a position and/or kinematics of the vehicle 102, time information, and so on, which may allow recipients to translate the collision detection data into other coordinate systems and/or frames of reference. In some embodiments, step 434 may comprise providing monitoring data 272 to a network-accessible service 154, storing the monitoring data 272 on a persistent, machine-readable storage media 152, and the like.

The method 400 ends at step 440 until additional sensor data is acquired.

Although FIG. 4 depicts steps in a particular sequence, the disclosure is not limited in this regard; for example, the vehicle 102 may acquire sensor data using the sensing system 110 while concurrently receiving sensor data from another entity at step 422, generating the collision detection model at step 432, and/or providing access to collision detection data at step 434.

In some embodiments, the collision detection system 101 may be further configured to operate the sensing system 110 in cooperation with sensing systems of other vehicles. The cooperative operation may comprise forming a multistatic sensor comprising the sensing system 110 and one or more sensing systems of other land vehicles. As used herein, a "multistatic sensor" refers to a sensor comprising two or more spatially diverse sensing systems, which may be configured to operate cooperatively. For example, one or more of the sensing systems may be configured to emit respective detection signals, which may be received by receivers of one or more of the sensing systems. Sensor cooperation may comprise coordinating one or more detection signals emitted by one or more sensing systems (e.g., beamforming, forming a phased array, or the like).

Figure 5A:
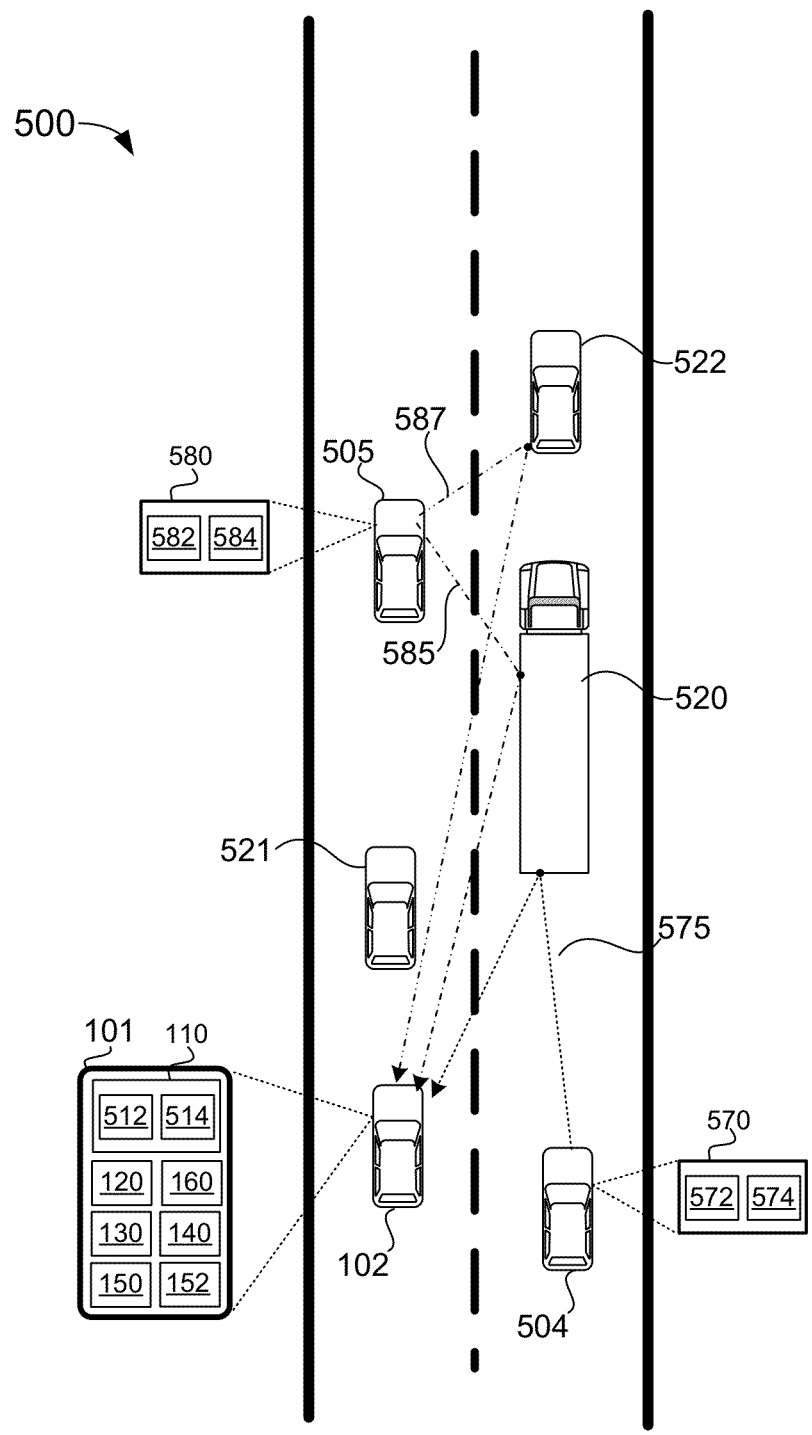
FIG. 5A depicts one embodiment of a collision detection system configured to coordinate sensor operation.

FIG. 5A depicts one embodiment 500 of a collision detection system 101 configured to coordinate sensor operation with other sensing systems. In example 500, the sensing system 110 comprises a detection signal emitter 512 and receiver 514. The emitter 512 may comprise a radar transmitter, EO emitter, acoustic emitter, ultrasonic emitters, or the like. The receiver 514 may be configured to detect one or more returned detection signals. Accordingly, the receiver 514 may comprise one or more antennas, EO detectors, acoustic receivers, ultrasonic receivers, or the like.

The collision detection system 101 may be configured to coordinate operation of the sensing system 110 with sensing systems of other vehicles (e.g., sensing systems 570 and/or 580). Coordination may comprise forming a multistatic sensor comprising the sensing system 110 and one or more of the sensing systems 570 and/or 580.

In some embodiments, the collision detection system 101 may coordinate with another sensing system to acquire information pertaining to an object that is outside of a detection range of the sensing system 110 and/or to augment sensor data obtained by the sensing system 110. As used herein, an object that is "outside of the detection range of the sensing system 110" refers to any object about which the sensing system 110 cannot reliably obtain information, which may include, but is not limited to: objects beyond a detection range of the sensing system 110, objects obscured or blocked by other objects, objects at a position and/or orientation that prevents the sensing system 110 from determining one or more kinematic characteristics of the object (e.g., as depicted in FIG. 2B), and so on. As such, an object for which sensor data is not sufficiently reliable and/or from which one or more kinematic characteristics cannot be reliably derived is deemed to be outside of the detection range of the sensing system 110. As used herein, sensor data that is "sufficiently reliable" refers to sensor data conforming to one or more reliability criteria, which may include, but are not limited to: a signal-to-noise threshold, a signal strength threshold, a resolution (e.g., accuracy) threshold, or the like.

The FIG. 5A example depicts a vehicle 522 that may be outside of the detection range of the sensing system 110; a vehicle 520 may "block" a detection signal of the emitter 512, such that the receiver 514 cannot reliably obtain data pertaining to the vehicle 522. In response to determining that the vehicle 522 is outside of the detection range of the sensing system 110, the collision detection system 101 may be configured to request sensor data pertaining to the vehicle 522 from one or more other vehicles (e.g., vehicle 505), as described above. The request(s) may be generated in response to determining that the vehicle 522 (or other region) is within a detection range and/or envelope of a sensing system of one or more of the other vehicles. Alternatively, or in addition, the coordination module 160 of the collision detection system 101 may be configured to request access to the sensing system 580 of the vehicle 505. Requesting access may comprise requesting that the sensing system 580 operate in coordination with the sensing system 110. In the FIG. 5A example, the coordination module 160 may be configured to form a multistatic sensor comprising the sensing system 110 of the first land vehicle 102 and the sensing system 580 of the land vehicle 505. The multistatic sensor may comprise a detection signal emitter 582 of the sensing system 580 and the detection signal receiver 514 of the sensing system 110. In response to the request, the emitter 582 may be configured to emit a detection signal 587 that is configured to be received by the receiver 514 of the sensing system 110. The detection signal 587 may be received in place of or in addition to a detection signal emitted by the emitter 512 of the sensing system 110 (a detection signal emitted by the emitter 512 is not shown in FIG. 5A to avoid obscuring the details of the embodiments). In addition, the collision detection system 101 may acquire auxiliary data from the vehicle 505, which may include, but is not limited to: orientation, position, velocity, acceleration, and so on of the vehicle 505 relative to the vehicle 102; a time synchronization signal; and so on. The processing module 120 may use the auxiliary data to interpret the received detection signal 587, which may comprise translating the detection signal 587 into a frame of reference of the vehicle 102, and so on, as described above.

As described above, coordinating sensor operation may further comprise the sensing system 110 generating one or more detection signals configured to be received by one or more other sensing systems 570 and/or 580. For example, the emitter 512 may be configured to transmit a detection signal (not shown) toward the vehicle 522; the detection signal may be received by a receiver 584 of the sensing system 580 and may provide information pertaining to the vehicle 522. The sensing system 580 may fuse sensor data received in response to self-emitted detection signal(s) with the sensor data received in response to the detection signal emitted by the vehicle 102, as described above. The multistatic sensor may, therefore, comprise emitters 512, 582 and receivers 514, 584 of both vehicles 102 and 505.

As described above, coordinating sensor operation may comprise forming a multistatic sensor and/or generating one or more detection signals configured to acquire information pertaining to one or more objects outside of the detection range of one or more sensing systems. Accordingly, coordinating sensor operation may comprise directing one or more detection signals in a pre-determined direction and/or coordinating two or more detection signals, which may include, but is not limited to: beamforming, forming and/or configuring a phased array, or the like.

The coordination module 160 may be configured to coordinate sensor operation to augment and/or improve data acquisition for one or more objects. For example, the coordination module 160 may request the sensing system 570 to generate a detection signal 575, which may be used to acquire more accurate sensor data pertaining to the vehicle 520; in the FIG. 5A example, a detection signal emitted by the sensing system 110 toward the vehicle 520 (not shown) may be partially obscured by another vehicle 521. In response to the request, the sensing system 570 may configure an emitter 572 to transmit the detection signal 575, which may be configured to acquire information pertaining to the vehicle 520 and be detected by the receiver 514 of the sensing system 110. As described above, the coordination may further comprise acquiring auxiliary data from the vehicle 504, which may allow the collision detection system 101 to process the detection signal 575, as described above.

Figure 5B:
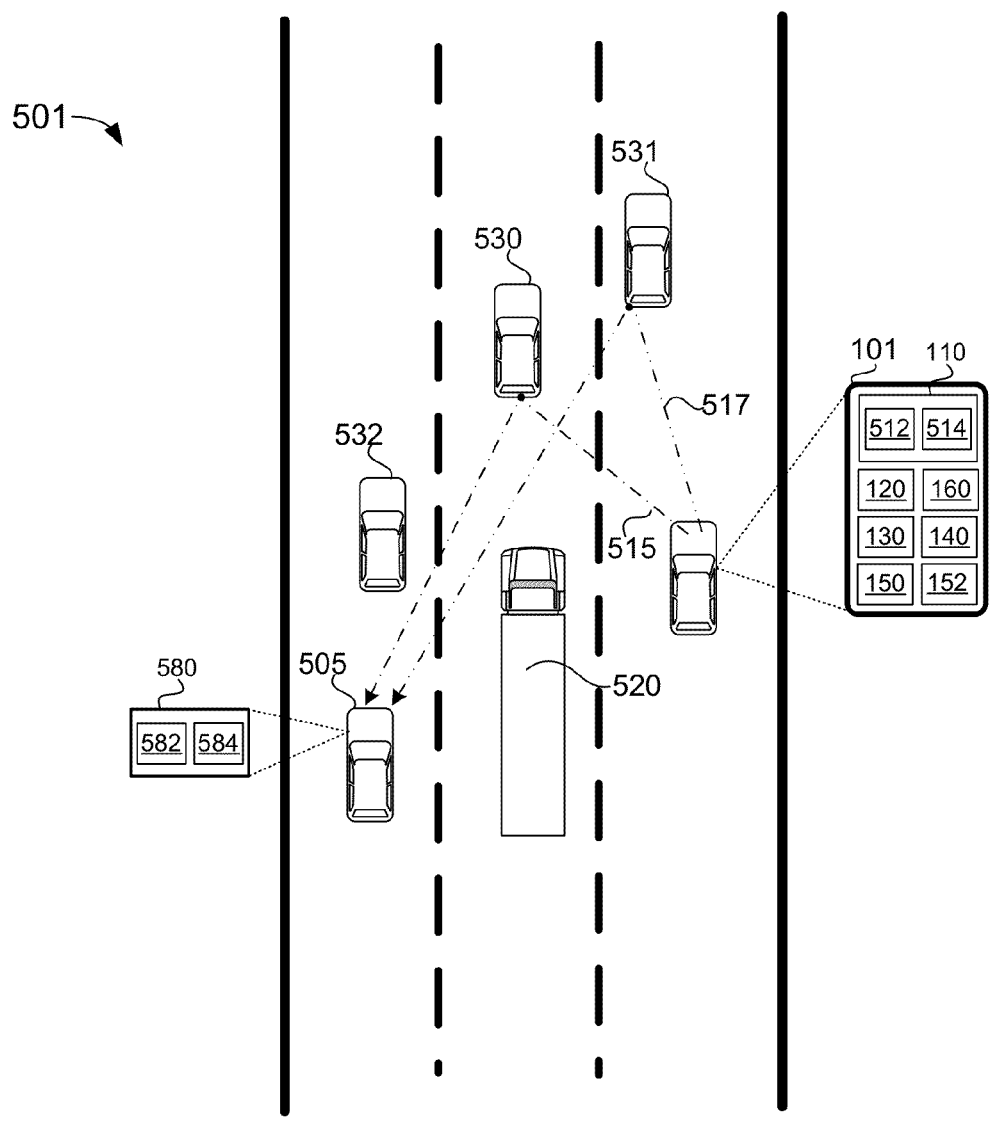
FIG. 5B depicts another embodiment of a collision detection system configured to coordinate sensor operation.

The coordination module 160 may be further configured to adapt detection signals generated by the emitter 512 in cooperation with other sensing systems 570 and/or 580. In some embodiments, the coordination module 160 may configure the emitter 512 in response to a request from one or more other sensing systems (e.g., a request to direct a detection signal at a particular object and/or region). FIG. 5B depicts another embodiment 501 of a collision detection system 101 configured to coordinate sensor operation with other sensing systems.

In the FIG. 5B example, the sensing system 101 may have a relatively unobstructed view of vehicles 530 and 531. However, the sensing system 580 may be obstructed by vehicles 532 and/or 520. The collision detection system 101 may receive a request to coordinate sensor operation via the communication module 130. The collision detection system 101 may configure the sensing system 110 in accordance with the request, which may comprise emitting one or more detection signals 515 and 517; the signals 515 and 517 may be configured to acquire kinematic data pertaining to the vehicles 530 and/or 531 and may be configured to be detected by the receiver 584 of the sensing system 580. Emitting the detection signals 515 and/or 517 may comprise emitting a plurality of separate detection signals, beamforming one or more detection signals of the emitter 512, or the like. The coordination module 160 may be further configured to transmit auxiliary data to the sensing system 580 by way of the communication module 130, which may allow the sensing system 580 to translate the received detection signal(s) 515 and/or 517 into a frame of reference of the sensing system 580, as described above.

Although FIGS. 5A and 5B depict detection signals 575, 585, 587, 515, and 517 as "point sources," the disclosure is not limited in this regard. The detection signals disclosed herein may comprise a plurality of detection signals and/or detection signal coverage ranges. Moreover, although FIGS. 5A and 5B depict a sensing system 110 that comprises both a detection signal emitter 512 and receiver 514, the disclosure is not limited in this regard. In some embodiments, for example, the sensing system 110 may be passive, and as such, may include a receiver 514 but not an emitter 512 (and/or the detection system emitter 512 may be deactivated). Accordingly, the sensing system 110 may acquire sensor data passively and/or in response to detection signals transmitted by other sensing systems, such as the sensing systems 570 and 580 described above. Alternatively, the sensing system 110 may be active and, as such, may include a detection signal emitter 512 but not a receiver 514 (and/or the receiver 514 may be deactivated). Accordingly, the sensing system 110 may acquire sensor data from other sensing systems (e.g., sensing systems 570 and/or 580) in response to detection signal(s) emitted thereby.

Figure 6:
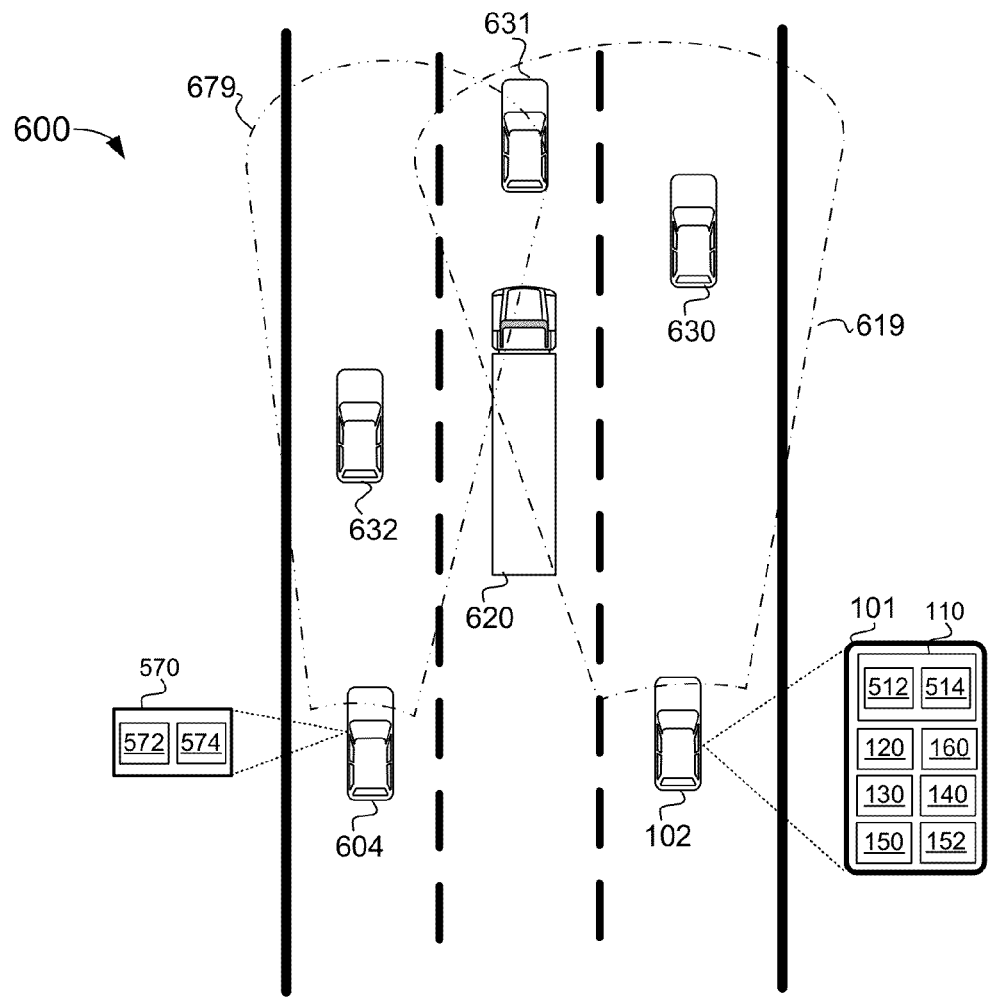
FIG. 6 depicts another embodiment of a collision detection system configured to coordinate sensor operation and/or share sensor data.

FIG. 6 depicts another embodiment 600 of a collision detection system 101 configured to coordinate sensor operation and/or share sensor data. As illustrated in FIG. 6, the sensing system 110 may be capable of acquiring sensor data pertaining to vehicles 620, 630 and, to a limited extent, vehicle 631; however, vehicle 632 may be out of the detection range of the sensing system 110 due to, inter alia, the vehicle 620. Another vehicle 604 may comprise a sensing system 570 that is capable of acquiring sensor data pertaining to the vehicles 620, 632 and, to a limited extent, vehicle 631. The vehicle 630 may be outside of the detection range of the sensing system 570.

The coordination module 160 may be configured to coordinate operation of the sensing systems 110 and 570. The coordination may comprise configuring the sensing systems 110 and 570 to acquire sensor data pertaining to regions (and/or objects) within the respective detection ranges thereof, and to rely on the other sensing system 110 or 570 for sensor data pertaining to objects and/or regions outside of the respective detection ranges thereof.

For instance, in the FIG. 6 example, the coordination module 160 may configure the sensing system 110 to acquire sensor data pertaining to region 619, which may comprise configuring the emitter 512 to emit detection signal(s) that are adapted to acquire information pertaining to objects in the region 619. The configuration may comprise beamforming, forming a phased array, directing and/or focusing one or more detection beams, or the like, as described above. Accordingly, the coordination may comprise configuring the sensing system 110 to acquire sensor data pertaining to areas and/or objects (e.g., vehicle 630) that are outside of the detection range of the sensing system 570. As a result, the detection signals of the sensing system 110 may be directed away from other regions and/or areas (e.g., region 679).

The coordination module 160 may be further configured to request that the sensing system 570 acquire sensor data pertaining to the region 679 (e.g., the vehicle 632). The request may identify the region 679 in a frame of reference of the vehicle 604, as described above. In response, the sensing system 570 may configure the emitter 572 to acquire sensor data pertaining to the region 679, as described above (e.g., directing and/or focusing detection signals to the region 679).

The coordination module 160 may be further configured to provide sensor data pertaining to the region 619 (and/or object 630) to the vehicle 604 and/or to receive sensor data pertaining to the region 679 (and/or object 632) from the vehicle 604 by use of the communication module 130. The coordination may further comprise communicating auxiliary data pertaining to the vehicles 102 and 604, such as position, velocity, acceleration, orientation, and so on, as described above.

In some embodiments, coordination may further comprise forming a multistatic sensor comprising the sensing system 110 and the sensing system 570. Forming the multistatic sensor may comprise configuring the emitter 512 and/or 572 to direct detection signals to particular objects and/or regions of interest. In the FIG. 6 example, the multistatic sensor may be configured to direct detection signals to the vehicle 631. As described above, neither sensing system 110 nor 570 may be capable of acquiring high-quality data pertaining to the vehicle 631 (e.g., due to vehicle obstructions). Forming the multistatic sensor may allow the sensing system 570 and/or 110 to acquire higher-quality data. For example, the emitters 572 and 512 may configure the phase and/or amplitude of the detection signals emitted thereby, such that detection signals emitted by the emitter 572 pertaining to the vehicle 631 are detected by the receiver 514 and detection signals emitted by the emitter 512 pertaining to the vehicle 631 are detected by the receiver 574. The sensor data acquired by the receivers 574 and 514 may be fused to determine a more accurate and/or complete model of the kinematics of the vehicle 631. As described above, fusing the sensor data may comprise translating the sensor data between frames of reference of the vehicles 102 and/or 604. As such, the coordination may comprise exchanging auxiliary data, as described above.

The coordination module 160 may be configured to request configuration changes in response to detecting the sensing system 570 in communication range of the communication module 130. Upon establishing communication, the coordination module 160 may be configured to coordinate operation of the sensing system 110 with the sensing system 570, as described above. Moreover, as additional vehicle sensing systems are discovered, they may be included in the coordination (e.g., to form a multistatic sensor comprising three or more sensing systems). Alternatively, the coordination module 160 may be configured to request coordinated operation as needed. For example, the coordination module 160 may be configured to coordinate sensing system operation in response to determining that one or more regions and/or objects are outside of the detection range of the sensing system 110 (e.g., are obscured by other objects).

In some embodiments, the coordination module 160 may be configured to respond to requests to coordinate with other sensing systems (e.g., a request from the sensing system 570). For example, sensing system 570 may initiate a request to coordinate sensor operation and, in response, the coordination module 160 may configure the sensing system 110 in accordance with the request. As described above, a request to coordinate sensor operation may comprise one or more offers, such as a payment, bid, offer for reciprocal data access, access to collision detection data, and so on.

Figure 7:
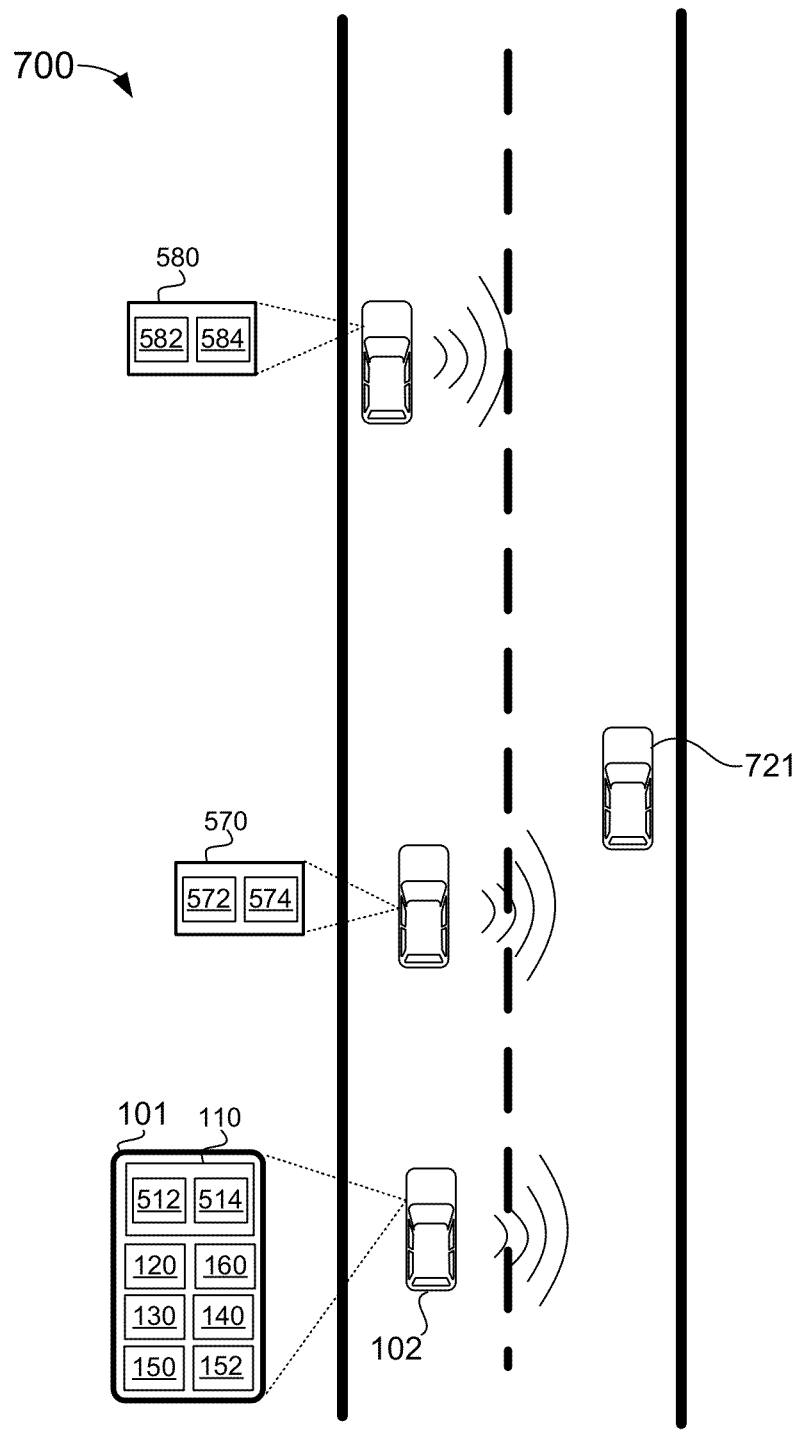
FIG. 7 depicts another embodiment of a collision detection system configured to coordinate sensor operation and/or share sensor data.

FIG. 7 depicts another example 700 of a collision detection system 101 configured to coordinate sensor operation and/or share sensor data. As described above, the coordination module 160 may be configured to coordinate sensor operation in response to detecting other sensing systems in a communication range of the communication module 130. In response to detecting one or more other sensing systems, the coordination module 160 may be configured to coordinate sensor operation, which may comprise forming a multistatic sensor, configuring detection signal(s) of the other sensing system(s), exchanging sensor data, exchanging auxiliary data, and so on.

FIG. 7 depicts one example of an ad hoc multistatic sensor comprising the sensing systems 110, 570, and 580. As other vehicles comprising other sensing systems (not shown) are detected, the coordination module 160 may coordinate with those sensing systems to augment the multistatic sensor. The multistatic sensor may comprise a plurality of emitters 512, 572, and/or 582 and/or a plurality of receivers 514, 574, and/or 584. The coordination module 160 may configure the emitters 512, 572, and/or 582 to direct detection signals emitted thereby to particular regions and/or objects of interest, as described above. The coordination may comprise coordinating a phase, amplitude, and/or timing of detection signals emitted by the emitters 512, 572, and/or 582 (e.g., using beamforming and/or phased array techniques). The coordination may further comprise coordinating the receivers 514, 574, and/or 584 to detect particular detection signals (e.g., form a phased array of receivers and/or antennas). Accordingly, the multistatic sensor formed from the sensing systems 110, 570, and/or 580 may comprise an arbitrary number of emitters and an arbitrary number of receivers (e.g., N emitters and M receivers).

The coordination module 160 may be configured to form a multistatic radar configured to acquire sensor data from various different points of view and/or orientations with respect to one or more objects. For example, each of the sensing systems 110, 570, and 580 may be configured to acquire sensor data pertaining to the vehicle 721. Detection signals emitted by the emitters 512, 572, and/or 582 may be detected by one or more of the receivers 514, 574, and/or 584. The collision detection system 101 may fuse sensor data acquired by the receiver 514 with sensor data acquired by receivers 574 and/or 584 of the other sensing system 570 and/or 580, as discussed above, to model the kinematics of the vehicle 721. Fusing sensor data acquired in response to different detection signals transmitted from different positions and/or orientations relative to the vehicle 721 may allow the collision detection system 101 to obtain a more complete and/or accurate model of the vehicle 721.

In some embodiments, the communication module 130 may be configured to extend the communication range of the collision detection system 101 using ad hoc networking mechanisms (e.g., ad hoc routing mechanisms). For example, the sensing system 580 may be outside of a direct communication range of the communication module 130. As used herein, a "direct communication range" refers to a range at which the communication module 130 can communicate directly with another entity (e.g., entity-to-entity communication). The communication module 130 may be configured to route communication through one or more entities that are within direct communication range. For example, the collision detection system 101 may be configured to route communication to/from the sensing system 580 through the sensing system 570.

Figure 8:
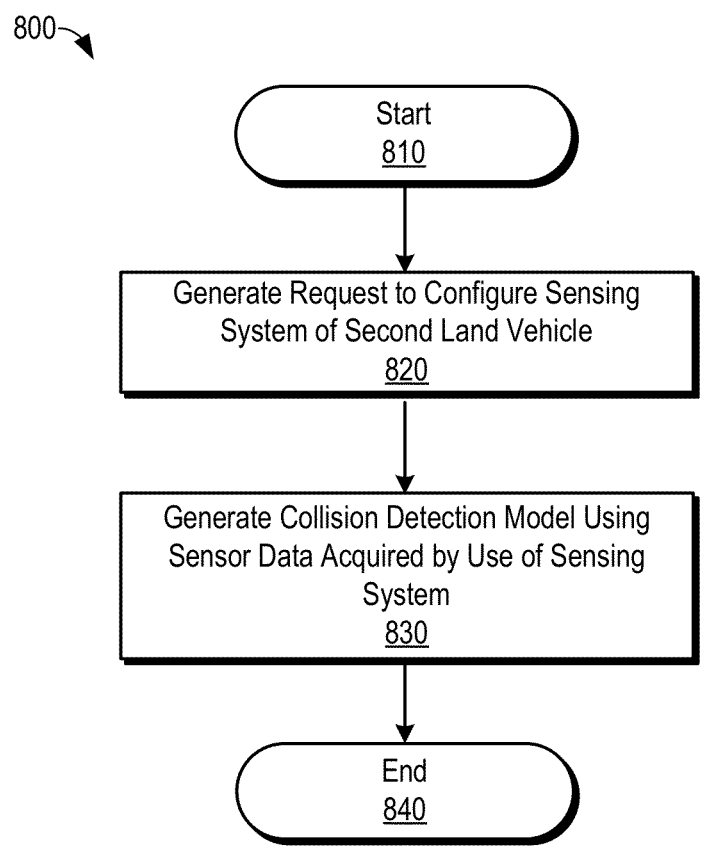
FIG. 8 is a flow diagram of one embodiment of a method for coordinating operation of a sensing system.

FIG. 8 is a flow diagram of one embodiment of a method 800 for coordinating operation of a sensing system. At step 810 the method 800 may start and be initialized, as described above.

Step 820 may comprise generating a request to configure a sensing system of a second land vehicle. The request may be generated by and/or transmitted from a collision detection system 101 of a first land vehicle 102 (e.g., a coordination module 160 of the collision detection system 101). The request may be generated and/or transmitted in response to the collision detection system 101 detecting the second land vehicle in communication range (direct or indirect, as described above), in response to the collision detection system 101 determining that a region and/or object is outside of a detection range of a sensing system 110 thereof, and/or determining that the object and/or region is inside of a detection range or envelope of the sensing system of the second land vehicle. Accordingly, the request to configure the sensing system of the second land vehicle may be made on an as-needed basis. The request may comprise an offer of compensation in exchange for configuring the sensing system. The offer may include, but is not limited to: a payment, a bid, reciprocal data access, and so on. Step 820 may further comprise receiving an offer (or counter offer), accepting the offer(s), and so on, as described above.

In some embodiments, configuring the sensing system at step 820 may comprise directing the sensing system to one or more specified regions and/or objects. Directing the sensing system at step 820 may comprise directing detection signals of the sensing system to the one or more regions and/or objects, which may comprise adapting phase, amplitude, timing, focus, or other characteristics of the detection signals emitted by the sensing system.

Step 820 may further comprise configuring the sensing system of the second land vehicle to operate in cooperation with one or more other sensing systems, which may comprise forming a multistatic sensor comprising at least a portion of the sensing system of the second land vehicle and at least a portion of one or more sensing systems of other land vehicles. The configuration of step 820 may, therefore, comprise a multistatic sensor configuration, which may include, but is not limited to: beamforming, forming a phased array, and so on.

Step 820 may further comprise configuring the sensing system of the second land vehicle to transmit sensor data to one or more other sensing systems and/or collision detection systems, such as the collision detection system 101 of the first land vehicle 102. Transmitting the sensor data may comprise exchanging sensor data acquired by use of the sensing system of the second land vehicle, communicating auxiliary data pertaining to the second vehicle, communicating collision detection data (e.g., portions of the collision detection model 122, collision detection alerts, and the like), and so on, as described above.

Step 830 may comprise generating a collision detection model using sensor data acquired by use of the sensing system of the second land vehicle (and as configured at step 820). Step 830 may comprise receiving sensor data acquired by use of a receiver of the second sensing system and communicated to the collision detection system 101 via the communication module 130. Alternatively, or in addition, step 830 may comprise a receiver 514 of the sensing system 110 detecting sensor data in response to one or more detection signals emitted by the sensing system of the second land vehicle. Step 830 may further comprise receiving and/or determining auxiliary data pertaining to the second land vehicle. Step 830 may further comprise translating sensor data into one or more other frames of reference and/or coordinate systems, providing collision detection data 222 to other sensing systems and/or vehicles, storing and/or transmitting monitoring data 272, and so on, as described above. Step 830 may further comprise detecting potential collisions using the collision detection model, generating and/or transmitting one or more alerts in response to detecting potential collisions, taking one or more collision avoidance actions, and so on. Step 830 may further comprise providing portions of the collision detection model to one or more other vehicles, as described above. The method 800 ends at step 840.

Figure 9:
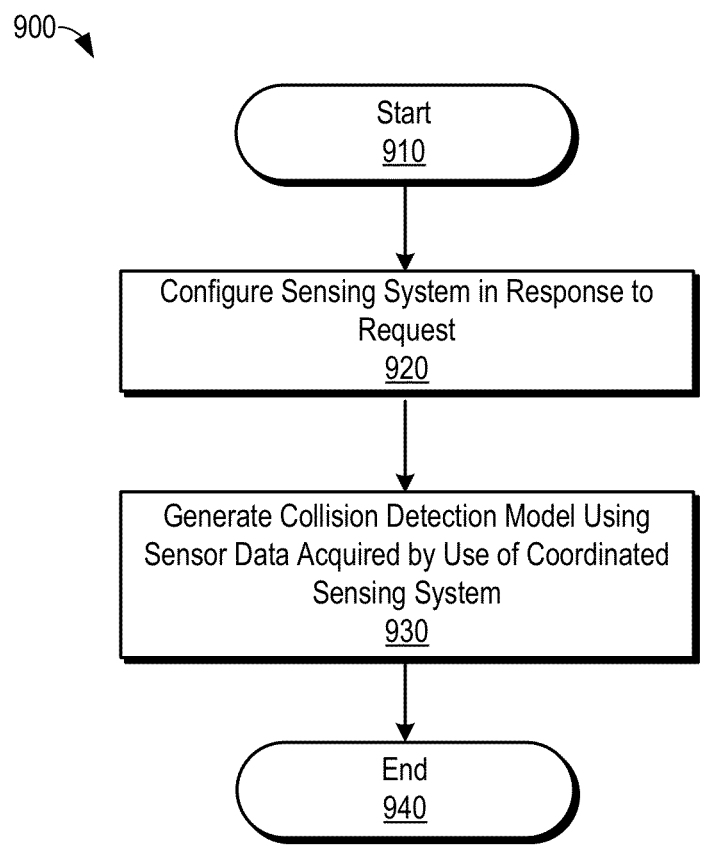
FIG. 9 is a flow diagram of another embodiment of a method for coordinating operation of a sensing system.

FIG. 9 is a flow diagram of one embodiment of a method 900 for coordinating operation of a sensing system. At step 910, the method 900 may start and be initialized, as described above.

Step 920 may comprise configuring the sensing system 110 of the collision detection system 101 in response to a request. The request may comprise a request to coordinate operation of the sensing system 110 with one or more sensing systems of other land vehicles, and may be received by way of the communication module 130. The request may comprise an offer of consideration in exchange for configuring the sensing system 110. Step 920 may comprise accepting the offer, generating a counteroffer, or the like, as described above.

Step 920 may comprise configuring the sensing system 110 to coordinate operation with other sensing systems, which may include, but is not limited to: directing the sensing system 110 to a particular region and/or object, providing sensor data acquired by use of the sensing system 110 to one or more other vehicles, providing auxiliary data pertaining to the vehicle 102 to the one or more other vehicles, forming a multistatic sensor comprising the sensing system 110, and the like. Accordingly, step 920 may comprise configuring detection signals generated by the emitter 512 of the sensing system 110 in cooperation with other sensing systems, which may include, but is not limited to: adapting phase, amplitude, timing, focus, or other characteristics of the detection signals, as described above. Step 920 may further comprise configuring a receiver 514 of the sensing system 110 to receive detection signals generated by the other sensing systems (e.g., to form a phased antenna array).

Step 930 may comprise generating a collision detection model using sensor data acquired by use of the sensing system as configured at step 920. Step 930 may, therefore, comprise generating the collision model using sensor data acquired by use of two or more sensing systems that are operating in coordination per step 920. Step 930 may comprise acquiring sensor data in response to one or more detection signals emitted by one or more other sensing systems, receiving sensor data acquired by use of one or more other sensing systems, receiving auxiliary data from one or more other sensing systems, and so on. Step 930 may further comprise detecting potential collisions using the collision detection model, generating and/or transmitting one or more alerts in response to detecting potential collisions, taking one or more collision avoidance actions, and so on. Step 930 may further comprise translating sensor data into one or more other frames of reference and/or coordinate systems, providing collision detection data 222 to other sensing systems and/or vehicles, storing and/or transmitting monitoring data 172, and so on, as described above. The method 900 ends at step 940.

In some embodiments, the collision detection system 101 may be configured to store and/or transmit monitoring data 272, which as described above, may comprise data for reconstructing and/or modeling peri-collisional circumstances before, during, and/or after a collision. The monitoring data 272 may include, but is not limited to: the collision detection model 122 and/or portions thereof (e.g., object kinematic information), sensor data acquired by use of the sensing system 110, sensor data acquired from other sources (e.g., other sensing systems), auxiliary data (e.g., orientation, position, velocity, acceleration, etc.) of the vehicle 102 and/or other vehicles, potential collisions detected by the collision detection system 101, avoidance actions taken (if any) in response to detecting the potential collision, collision kinematics, post-collision kinematics, and so on.

Figure 10:
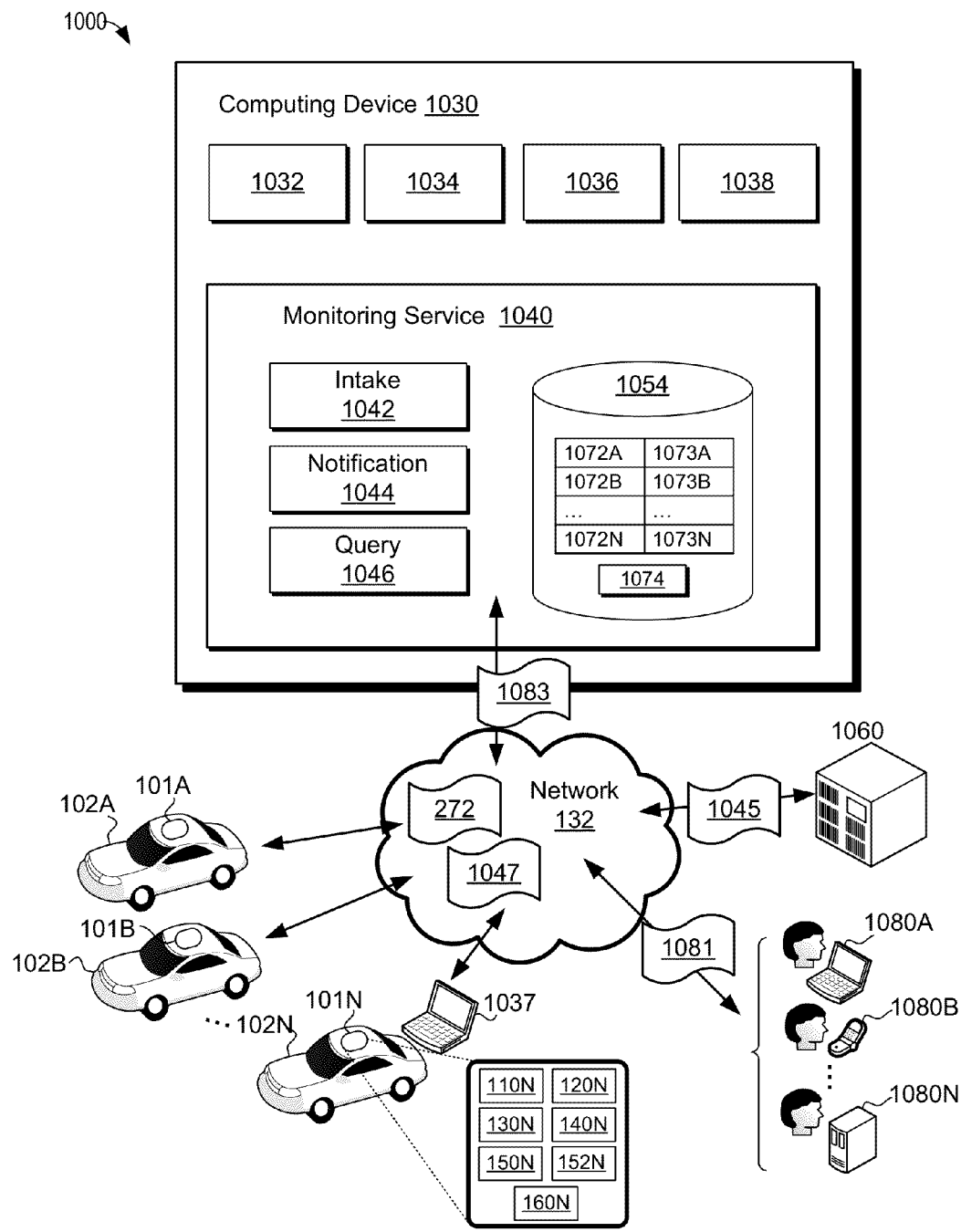
FIG. 10 is a block diagram of one embodiment of a monitoring service.

FIG. 10 is a block diagram 1000 of one embodiment of a monitoring service 1040. The monitoring service 1040 may operate on a computing device 1030, which may comprise a processor 1032, a memory 1034, a communication module 1036, and persistent storage 1038, as described above. The monitoring service 1040 may be embodied as one or more machine-readable storage medium stored on a persistent storage medium (e.g., persistent storage 1038). The instructions comprising the monitoring service 1040 may be configured for execution on the computing device 1030 (e.g., configured for execution on the processor 1032 of the computing device 1030). Alternatively, or in addition, portions of the monitoring service 1040 (as well as the other modules and systems disclosed herein) may be implemented using machine elements, such as special purpose processors, ASICs, FPGAs, PALs, PLDs, PLAs, or the like.

An intake module 1042 may be configured to request and/or receive vehicle monitoring data 272 from collision detection systems 101A-N of land vehicles 102A-N. As described above, the monitoring data 272 may include, but is not limited to: collision detection data 222, sensor data used by a collision detection system 101A-N (sensor data acquired by the collision detection system 101A-N, acquired from other sources, and so on), the collision detection model 122 (and/or portions thereof), information pertaining to potential collisions detected by a collision detection system 101A-N, collision alerts generated by a collision detection system 101A-N, diagnostic information pertaining to the vehicle 102A-N, collision reconstruction data, object kinematics, vehicle operating conditions, auxiliary data (e.g., location time information, etc.), and so on.

In some embodiments, the monitoring data 272 may be received via the network 132 (through the communication module 1036 of the computing device 1030). For example, and as described above, one or more of the collision detection systems 101A-N (e.g., collision detection systems 101A-C) may be configured to maintain and/or transmit monitoring data 272 during vehicle operation (e.g., in "real-time"). Alternatively, one or more of the collision detection systems 101A-N may be configured to transmit monitoring data 272 periodically, intermittently, and/or in response to detecting a particular event or operating condition. For example, a collision detection system 101A-N may be configured to transmit monitoring data 272 in response to detecting a vehicle operating in a particular way (e.g., speeding, driving erratically, or the like), detecting a particular vehicle, detecting a potential collision, detecting an actual collision, or the like. Alternatively, or in addition, one or more collision detection systems 101A-N may be configured to transmit monitoring data 272 in response to a request from the monitoring service 1040. Accordingly, the collision detection systems 101A-N may be configured to "push" monitoring data 272 to the monitoring service 1040 and/or the monitoring service 1040 may be configured to "pull" monitoring data 272 from one or more of the collision detection systems 101A-N.

As described above, a collision detection system 101A-N may be configured to transmit monitoring data 272 intermittently. For example, the collision detection system 101N may be configured to store monitoring data 272 on the storage module 150N, which may be intermittently uploaded to the monitoring service 1040. For example, monitoring data 272 may be uploaded when the communication module 130N is activated, when the communication module 130N is in communication with the network 132 (e.g., is in communication range of a wireless access point), or the like. In another example, stored monitoring data 272 may be accessed from the storage service 150N by a computing device 1037, which may be configured to transmit the monitoring data 272 to the monitoring service 1040. The stored monitoring data 272 may be accessed when the vehicle 102N is serviced, is in communication range of the computing device 1037, may be accessed as part of a post-collision diagnostic, or the like. In some embodiments, the computing device 1037 may comprise a mobile communication device (e.g., cellular telephone), which may access the stored monitoring data 272 via a wireless communication interface (e.g., near-field communication (NFC), BLUETOOTH®, or the like).

The monitoring service 1040 may be configured to offer consideration for providing the monitoring data 272. The consideration may comprise one or more of a payment, bid, reciprocal data access (e.g., access to stored monitoring data 1072A-N, described below), or the like. The consideration may further comprise access to features of the monitoring service 1040, such as access to collision alert(s) 1047 (described below), and so on.

Monitoring data 272 received at the monitoring service 1040 may be processed by an intake module 1042. The intake module 1042 may be configured to process and/or store monitoring data entries 1072A-N in a persistent storage 1054. The intake module 1042 may be further configured to index the monitoring data 1072A-N, by one or more index criteria, which may include, but are not limited to: time, location, vehicle identifier(s), detected collision(s), and/or other suitable criteria. The index criteria may be stored in respective index entries 1073A-N. Alternatively, indexing criteria may be stored with the monitoring data entries 1072A-N.

The intake module 1042 may be configured to extract and/or derive indexing criteria from received monitoring data 272. For example, the monitoring data 272 may comprise a time synchronization signal, time stamp, or other timing data, from which time indexing criteria may be determined. Similarly, the monitoring data 272 may comprise auxiliary data (e.g., GPS coordinates), from which location indexing information may be determined. Accordingly, extracting indexing criteria may comprise extracting one or more data streams and/or data fields from the monitoring data 272 (e.g., extracting a time stamp and/or time synchronization signal, extracting location coordinates, and so on).

The monitoring data 272 may further comprise information from which indexing criteria may be derived. Deriving indexing criteria may comprise using the monitoring data 272 to determine indexing criteria. For example, vehicle identifier(s) may be derived from received monitoring data 272, such as VIN codes, license plate information, vehicle RFID, imagery data (e.g., image(s) of vehicle license plates, etc.), and so on. Deriving indexing criteria may comprise determining a vehicle identifier from sensor data (e.g., an image in the monitoring data 272), determining vehicle location from vehicle kinematics, and so on.

In some embodiments, the intake module 1042 may be configured to translate and/or normalize the monitoring data 272 (and/or indexing data extracted and/or derived therefrom). For example, the intake module 1042 may be configured to translate timing information into a suitable time zone, convert and/or translate location information (e.g., from GPS coordinates into another location reference and/or coordinate system), translate collision detection data, such as the collision detection model 122 and/or vehicle kinematic information into a different frame of reference and/or coordinate system, and so on, as described above.

In some embodiments, the intake module 1042 may be configured to augment the monitoring data 272. For example, the intake module 1042 may be configured to combine monitoring data 272 pertaining to the same time and/or location (e.g., overlapping times and/or locations). The intake module 1042 may be configured to aggregate "overlapping" monitoring data 272, which may comprise revising and/or refining portions of the monitoring data 272.

The intake module 1042 may be further configured to authenticate monitoring data 272, which may include, but is not limited to: verifying a credential of the monitoring data 272, validating a signature on the monitoring data 272, decrypting the monitoring data 272, or the like. In some embodiments, monitoring data 272 that cannot be authenticated may be rejected (e.g., not included in the persistent storage 1054 and/or indexed as described above).

As described above, the intake module 1042 may be configured to request monitoring data from one or more vehicles 101A-N via the network 132. The request may specify a time, location, and/or vehicle identifier(s) of interest. For example, the intake module 1042 may issue a request for monitoring data pertaining to a collision to one or more vehicles 101A-N. The request may specify a time and/or location of the collision and may identify vehicles involved in the collision. The time and/or location may be specified as ranges, such as a time frame before, during, and after a collision, locations within a proximity threshold of the collision location, and so on. The request may further comprise identifying information pertaining to the vehicles involved in the collision. In response to the request, the collision detection systems 101A-N may determine whether any stored monitoring data satisfies the request and, if so, may transmit the monitoring data 272 to the monitoring service 1040, as described above. Alternatively, or in addition, the collision detection systems 101A-N may be configured to store the request and may be configured to transmit monitoring data 272 in response to acquiring monitoring data 272 that satisfies the request.

In some embodiments, the monitoring service 1040 may comprise a notification module 1044 configured to determine whether received monitoring data 272 indicates that a collision has occurred (or is predicted to occur). The notification module 1044 may be configured to transmit one or more collision notifications 1045 and/or collision alerts 1047. The notification module 1044 may be configured to coordinate with an emergency response entity 1060 in response to receiving monitoring data 272 indicative of a collision; the monitoring service 1040 may transmit a collision notification 1045 to an emergency response entity 1060 or other entity (e.g., public safety entity, traffic control entity, or the like). Transmitting the collision notification 1045 may comprise extracting collision information from the monitoring data 272, which, as described above, may include, but is not limited to: a collision detection model, sensor data, kinematic information pertaining to the collision (e.g., determine impact velocity, estimate forces involved in the collision, and so on), estimates of the resting positions of the vehicles involved in the collision (and/or the vehicle occupants), location of the collision, time of the collision, number of vehicles involved in the collision, estimated severity of the collision, and so on. Transmitting the collision notification 1045 may comprise determining identifying the emergency response entity 1060 based upon location of the collision, translating and/or converting the monitoring data 272 into a suitable format for the emergency response entity 1060, and so on.

The notification module 1044 may be further configured to provide collision alerts 1047 to one or more of the collision detection systems 101A-N. Collision alerts 1047 may be transmitted to vehicles 102A-N within a proximity of a collision and/or vehicles 102A-N that may be traveling toward a collision. A collision alert 1047 may comprise information pertaining to the location and/or time of the collision, estimates of the severity of the collision, and so on, as described above. The collision detection systems 101A-N may alert the vehicle operator to the collision and/or recommend an alternative route to a navigation system of the vehicle 102A-N in response to receiving the collision alert 1047.

The notification module 1044 may be further configured to transmit collision notifications 1045 and/or collision alerts 1047 to other objects and/or entities, such as pedestrians, mobile communication devices, and the like. For example, in some embodiments, the notification module 1044 may be configured to broadcast a collision alert 1047 to mobile communication devices (of one or more pedestrians and/or vehicle operators) via one or more wireless transmitters (e.g., cellular data transceivers) in the network 132. The collision alert 1047 may indicate that a collision has occurred and/or is predicted to occur, as described above.

In another example, the monitoring service 1040 may respond to requests from the emergency services entity 1060. For example, the emergency service entity 1060 may request data pertaining to a particular vehicle, such as a vehicle that is subject to an AMBER ALERT™. The monitoring service 1040 may request data pertaining to the vehicle from the vehicles 101A-N. In response to receiving relevant monitoring data 272, the monitoring service 1040 may transmit the monitoring data 272 to the emergency services entity 1060. Transmitting the monitoring data 272 to the emergency service entity 1060 may comprise translating and/or converting the monitoring data 272 into a suitable format, as described above. The monitoring service 1040 may provide the monitoring data 272 as it is received (e.g., in "real-time") and/or may provide monitoring data stored on the persistent storage 1054.

As described above, the intake module 1042 may be configured to store and/or index monitoring data 1072A-N in the persistent storage 1054. The monitoring data 1072A-N may be retained on the persistent storage 1054 for a pre-determined time period. In some embodiments, monitoring data 1072A-N pertaining to collisions (and/or potential collisions) may be retained, whereas other monitoring data 1072A-N may be removed after a pre-determined time period (and/or moved to longer-term storage, such as tape backup or the like).

The monitoring service 1040 may be further configured to respond to requests 1081 for monitoring data from one or more requesting entities 1080A-N. A requesting entity 1080A-N may include, but is not limited to: an individual, a company (e.g., an insurance company), an investigative entity (e.g., police department), an adjudicative entity (e.g., a court, mediator, etc.), or the like. A request for monitoring data 1081 may be generated by a computing device, such as a notebook, laptop, tablet, smart phone, or the like, and may comprise one or more request criteria, such as a time, location, vehicle identifier(s) or the like.

The monitoring service 1040 may comprise a query module 1046 configured to respond to requests 1081 for monitoring data. The query module 1046 may extract request criteria from a request, and may determine whether the persistent storage comprises monitoring data 1072A-N corresponding to the request (e.g., monitoring data pertaining to a time and/or location specified in the request 1081). The determination may be made by comparing criteria of the request 1081 to the entries 1072A-N and/or the indexing entries 1073A-N. The query module 1046 may generate a response 1083, which may comprise portions of the conforming monitoring data 1072A-N. Generating the response 1083 may comprise converting and/or translating the monitoring data 1072A-N (and/or portions thereof), as described above. For example, a requesting entity 1080A-N may be the owner of a vehicle involved in a collision, and the request 1081 may comprise a request for monitoring data 1072A-N pertaining to the time and/or location of the collision. The monitoring data 1072A-N may be used reconstruct the peri-collisional circumstances in order to, inter alia, determine fault and/or insurance coverage for the collision.

In some embodiments, the monitoring service 1040 may provide access to the monitoring entries 1072A-N in exchange for consideration, such as a payment, bid, reciprocal data access (e.g., access to monitoring data 272 of one or more vehicle(s) of the requesting entity 1080A-N), or the like. The request 1081 may, therefore, comprise an offer and/or payment. The query module 1046 may determine whether the offer of the request 1081 is sufficient (e.g., complies with one or more policy rules). The query module 1046 may reject the request, which may comprise transmitting an indication that the request was not fulfilled, transmitting a counteroffer to the requesting entity 1080A-N, or the like. Accepting the request may comprise transferring a payment (or other exchange) and transmitting a response 1083 to the requesting entity 1080A-N, as described above. Alternatively, or in addition, the query module 1046 may be configured to generate a bill and/or invoice in response to providing access to one or more of the monitoring entries 1072A-N. The bill and/or invoice may be generated based upon a pre-determined price list, which may be provided to the requesting entity 1080A-N. The bill and/or invoice may be transmitted to the requesting entity 1080A-N via the network 132.

In some embodiments, the query module 1046 is configured to determine whether the requesting entity 1080A-N is authorized to access the stored monitoring data (monitoring entries 1072A-N), which may comprise authenticating the requesting entity 1080A-N by, inter alia, authenticating the request 1081, authenticating a credential provided by the requesting entity 1080A-N, or the like. Authorization to access the stored monitoring entries 1072A-N may be based upon one or more access control data structures 1074 maintained by the monitoring service 1040. The access control data structures 1074 may comprise any suitable data structure for determining access rights, such as access control lists (ACL), role-based access, group rights, or the like. For example, a requesting entity 1080A may subscribe to the monitoring service 1040 and, as such, may be identified as an "authorized entity" in one or more access control data structures 1074. The monitoring service 1040 may allow the requesting entity 1080A to access the monitoring entries 1072A-N in response to authenticating the identity of the requesting entity 1080A and/or verifying that the requesting entity 1080A is included in one or more of the access control data structures 1074.

Figure 11:
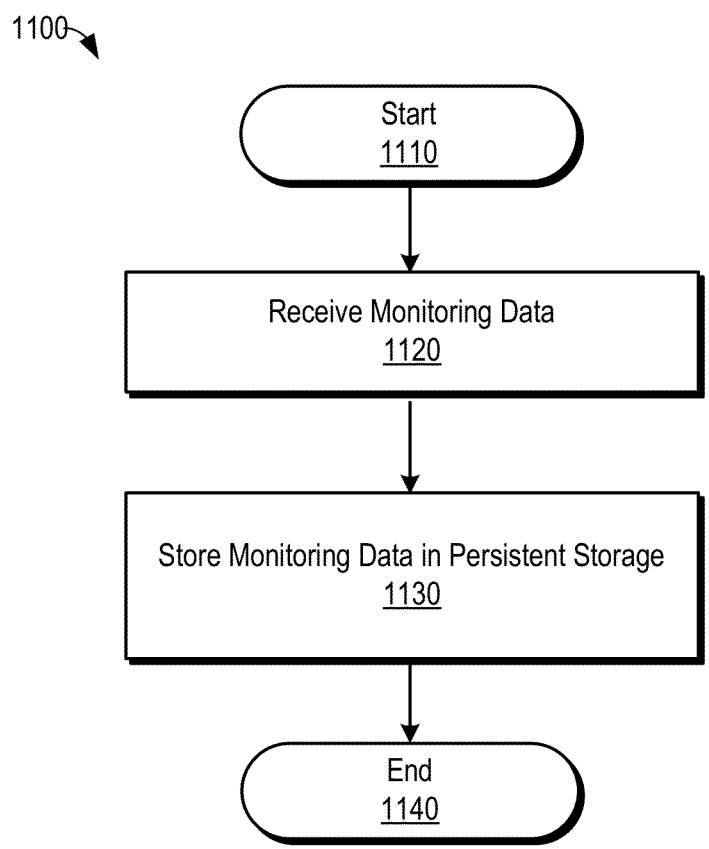
FIG. 11 is a flow diagram of one embodiment of a method for providing a monitoring service.

FIG. 11 is a flow diagram of one embodiment of a method 1100 for providing a monitoring service. At step 1110 the method 1100 starts and is initialized, as described above.

Step 1120 may comprise receiving monitoring data 272 from one or more collision detection systems 101A-N. The monitoring data 272 may be received in response to a request from the monitoring service 1040, in response to a collision detection system 101A-N transmitting monitoring data 272 during operation and/or at a particular interval and/or in response to a particular event (e.g., a collision, the collision detection system 101A-N establishing communication with the network 132, or the like), and/or in response to a computing device 1037 accessing stored monitoring data 272, as described above.

Step 1120 may further comprise offering and/or providing consideration in exchange for the monitoring data 272. The exchange may comprise providing a payment for the monitoring data 272, bidding for access to the monitoring data 272, providing reciprocal access, or the like, as described above.

Step 1130 may comprise storing the monitoring data on a persistent storage 1054. Step 1130 may further comprise indexing the monitoring data by one or more indexing criteria, which may include, but is not limited to: time, location, vehicle identifiers, or the like. Accordingly, step 1130 may comprise extracting and/or deriving indexing criteria 1130 from the monitoring data 272 received at step 1120, as described above. In some embodiments, step 1130 further comprises translating and/or converting the monitoring data 272 (e.g., translating the monitoring data 272 from a frame of reference of a particular vehicle 102A-N into an absolute frame of reference, or the like).

The monitoring data 272 received at step 1120 may indicate that a collision has occurred and/or is predicted to occur. Accordingly, step 1130 may further comprise generating and/or transmitting a collision notification 1045 to an emergency services entity 1060. As described above, the collision notification 1045 may identify the location and/or time of the collision, may include estimates of collision forces (and resulting collision impact forces and/or vehicle kinematics), and so on. Step 1130 may further comprise generating and/or transmitting one or more collision alerts to one or more vehicles 102A-N, mobile communication devices, pedestrians, emergency services entities, or the like, as described above. The method 1100 ends at step 1140.

Figure 12:
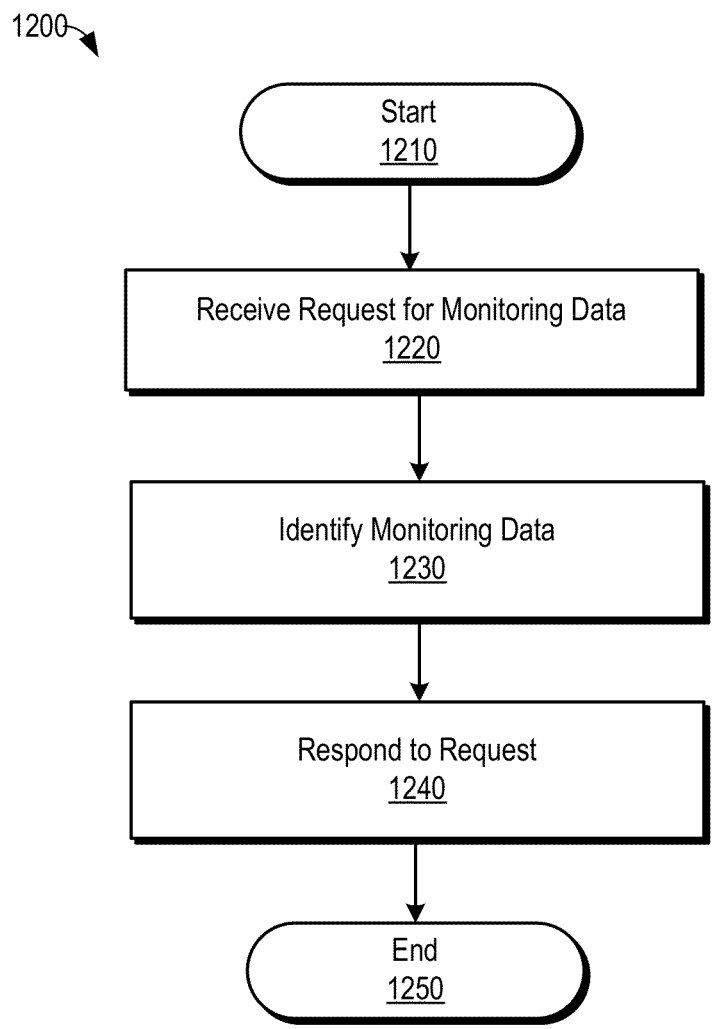
FIG. 12 is a flow diagram of another embodiment of a method for providing a monitoring service.

FIG. 12 is a flow diagram of another embodiment of a method 1200 for providing a monitoring service. At step 1210 the method 1200 starts and is initialized, as described above.

Step 1220 may comprise receiving a request for monitoring data (e.g., data of one or more monitoring entries 1072A-N). The request of step 1220 may be received from a requesting entity 1080A-N by way of a network 132. The request may include request criteria, such as a time, location, vehicle identifier(s) or the like, as described above. The request may further comprise an offer of consideration in exchange for fulfilling the request. The offer may include, but is not limited to: a payment, bid, reciprocal data access, or the like. Step 1220 may comprise determining whether the offer is acceptable and, if not, rejecting the offer and/or generating and/or transmitting an offer (or counter offer) to the requesting entity 1080A-N. Step 1220 may further comprise authenticating the requesting entity and/or determining whether the requesting entity is authorized to access the stored monitoring entries 1072A-N, as described above (e.g., based upon one or more access control data structures 1074).

Step 1230 may comprise identifying monitoring data that conforms to the request (e.g., monitoring data associated with a time, location, and/or vehicle identifier specified in the request). As such, step 1230 may comprise identifying one or more monitoring entries 1072A-N that satisfy the request criteria, which may include comparing criteria of the request to the entries 1072A-N and/or index entries 1073A-N, as described above. For example, step 1230 may comprise identifying monitoring entries 1072A-N associated with a time specified in the request, associated with a location specified in the request, associated with a vehicle identifier specified in the request, and so on.

Step 1240 may comprise generating and/or transmitting a response 1083 to the requesting entity 1080A-N. Step 1240 may comprise translating and/or converting data of the monitoring entries 1072A-N identified at step 1230, as described above. The method 1200 ends at step 1250.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

What is claimed is:

1. A system, comprising:
an intake module configured to receive monitoring data from collision detection systems of respective land vehicles and to store the received monitoring data on a persistent store, wherein the intake module is configured to receive monitoring data from a first land vehicle, the monitoring data comprising an identifier of a second land vehicle captured by use of a sensing system of the first land vehicle, and wherein the intake module derives indexing criteria from the monitoring data received from the first land vehicle, the indexing criteria comprising the identifier of the second land vehicle; and
a query module configured to respond to a request to access the stored monitoring data.

2. The system of claim 1, further comprising a notification module configured to transmit a collision alert in response to determining that the received monitoring data indicates that a collision has occurred and/or is predicted to occur.

3. The system of claim 2, wherein the notification module is configured to transmit the collision alert to one or more of a land vehicle, pedestrian, and a mobile communication device.

4. The system of claim 2, wherein the collision alert comprises a location of the collision.

5. The system of claim 2, wherein the collision alert comprises a time of the collision.

6. The system of claim 2, wherein the collision alert comprises an identifier of an object involved in the collision.

7. The system of claim 2, wherein the notification module is configured to identify a vehicle within a proximity threshold of the collision, and to transmit the collision alert to the identified vehicle.

8. The system of claim 1, wherein the request specifies a location, and wherein the query module is configured to identify stored monitoring data pertaining to the specified location.

9. The system of claim 8, wherein the query module is configured to compare the location specified in the request with a location associated with the stored monitoring data.

10. The system of claim 1, wherein the request specifies a time, and wherein the query module is configured to identify stored monitoring data pertaining to the specified time.

11. The system of claim 10, wherein the query module is configured to compare the time specified in the request with a time associated with the stored monitoring data.

12. The system of claim 1, wherein the request comprises a vehicle identifier, and wherein the query module is configured to identify stored monitoring data associated with the vehicle identifier.

13. The system of claim 12, wherein the query module is configured to compare the vehicle identifier specified in the request with a vehicle identifier associated with the stored monitoring data.

14. The system of claim 1, wherein the intake module is configured to combine monitoring data of two or more different vehicles and to store the combined monitoring data on the persistent storage.

15. The system of claim 14, wherein combining the received monitoring data comprises identifying received monitoring data pertaining to the same location and time.

16. The system of claim 1, wherein the intake module is configured to index the received monitoring data.

17. The system of claim 16, wherein the intake module is configured to index the received monitoring data based on a time associated with the received monitoring data.

18. The system of claim 16, wherein the intake module is configured to index the received monitoring data based on a location associated with the received monitoring data.

19. The system of claim 16, wherein the intake module is configured to index the received monitoring data based on a vehicle identifier associated with the received monitoring data.

20. The system of claim 1, wherein the intake module is configured to issue a request for monitoring data of a first land vehicle.

21. The system of claim 20, wherein the issued request for monitoring data of the first land vehicle specifies a time and location of interest.

22. The system of claim 20, wherein the issued request for monitoring data of the first land vehicle comprises an offer that includes one or more of a payment, a bid, and reciprocal monitoring data access.

23. The system of claim 1, wherein the received monitoring data comprises sensor data acquired by use of a sensing system of a first land vehicle, and wherein the intake module is configured to translate the sensor data from a frame of reference of the first land vehicle.

24. The system of claim 1, wherein the intake module is configured to receive the monitoring data from a land vehicle over a network.

25. The system of claim 1, wherein the query module is configured receive the request for access to the stored monitoring data over a network.

* * * * *